(12) United States Patent
Homma

(10) Patent No.: US 8,595,825 B2
(45) Date of Patent: Nov. 26, 2013

(54) IMAGE PROCESSING APPARATUS, PROCESSING FLOW CONTROL METHOD, IMAGE FORMING SYSTEM, AND STORAGE MEDIUM

(75) Inventor: Takayuki Homma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/369,415

(22) Filed: Feb. 9, 2012

(65) Prior Publication Data

US 2012/0144478 A1 Jun. 7, 2012

Related U.S. Application Data

(63) Continuation of application No. 12/344,926, filed on Dec. 29, 2008, now Pat. No. 8,146,152.

(30) Foreign Application Priority Data

Dec. 26, 2007 (JP) .................................. 2007-334486
Mar. 31, 2008 (JP) .................................. 2008-92373

(51) Int. Cl.
*G06F 21/00* (2013.01)

(52) U.S. Cl.
USPC .................. 726/19; 726/17; 726/21; 713/182

(58) Field of Classification Search
None
See application file for complete search history.

(56) References Cited

U.S. PATENT DOCUMENTS

| | | | |
|---|---|---|---|
| 5,542,085 A | 7/1996 | Kanzaki et al. | 395/600 |
| 6,850,956 B1 | 2/2005 | Knutson | 707/201 |
| 7,134,086 B2 | 11/2006 | Kodosky | 715/763 |
| 8,060,930 B2 * | 11/2011 | Lovat et al. | 726/19 |
| 8,115,946 B2 * | 2/2012 | Plewnia | 358/1.15 |
| 8,125,666 B2 * | 2/2012 | Mathieson et al. | 358/1.15 |
| 2001/0034879 A1 | 10/2001 | Washington et al. | 717/1 |
| 2006/0282466 A1 * | 12/2006 | Yasukaga et al. | 707/104.1 |
| 2007/0074286 A1 | 3/2007 | Wendling | 726/21 |
| 2007/0150536 A1 * | 6/2007 | Ahmed et al. | 709/203 |
| 2007/0194882 A1 | 8/2007 | Yokota et al. | 340/5.61 |
| 2007/0258112 A1 * | 11/2007 | Levine | 358/448 |
| 2007/0296933 A1 * | 12/2007 | Watanabe et al. | 355/18 |
| 2008/0040799 A1 | 2/2008 | Matsuda et al. | 726/21 |
| 2008/0068647 A1 * | 3/2008 | Isobe et al. | 358/1.15 |

FOREIGN PATENT DOCUMENTS

| | | |
|---|---|---|
| GB | 2 407 900 A | 5/2005 |
| JP | 2004-287861 A | 10/2004 |
| JP | 2005-122554 A | 5/2005 |
| JP | 2005-173891 A | 6/2005 |
| JP | 2006-246084 A | 9/2006 |
| JP | 10-083263 A | 3/2008 |
| KR | 10-2004-0093377 A | 11/2004 |

* cited by examiner

*Primary Examiner* — Gilberto Barron, Jr.
*Assistant Examiner* — Abdulhakim Nobahar
(74) *Attorney, Agent, or Firm* — Fitzpatrick, Cella, Harper & Scinto

(57) ABSTRACT

An image processing apparatus capable of reducing the number of processing flows and also reduce time and effort required by a user in searching a desired processing flow. The image processing apparatus including an authentication unit adapted to execute user authentication, and an execution unit adapted to execute processing on image data with a plurality of processes as a sequential processing flow while cooperating a plurality of different functions with one another. Setting data personalized for a user authenticated by the authentication unit is obtained, and the plurality of processes is registered as a sequential processing flow. The processing flow is executed with a part of the processing flow replaced by processing personalized for the user set in the setting data, upon executing the registered processing flow.

9 Claims, 20 Drawing Sheets

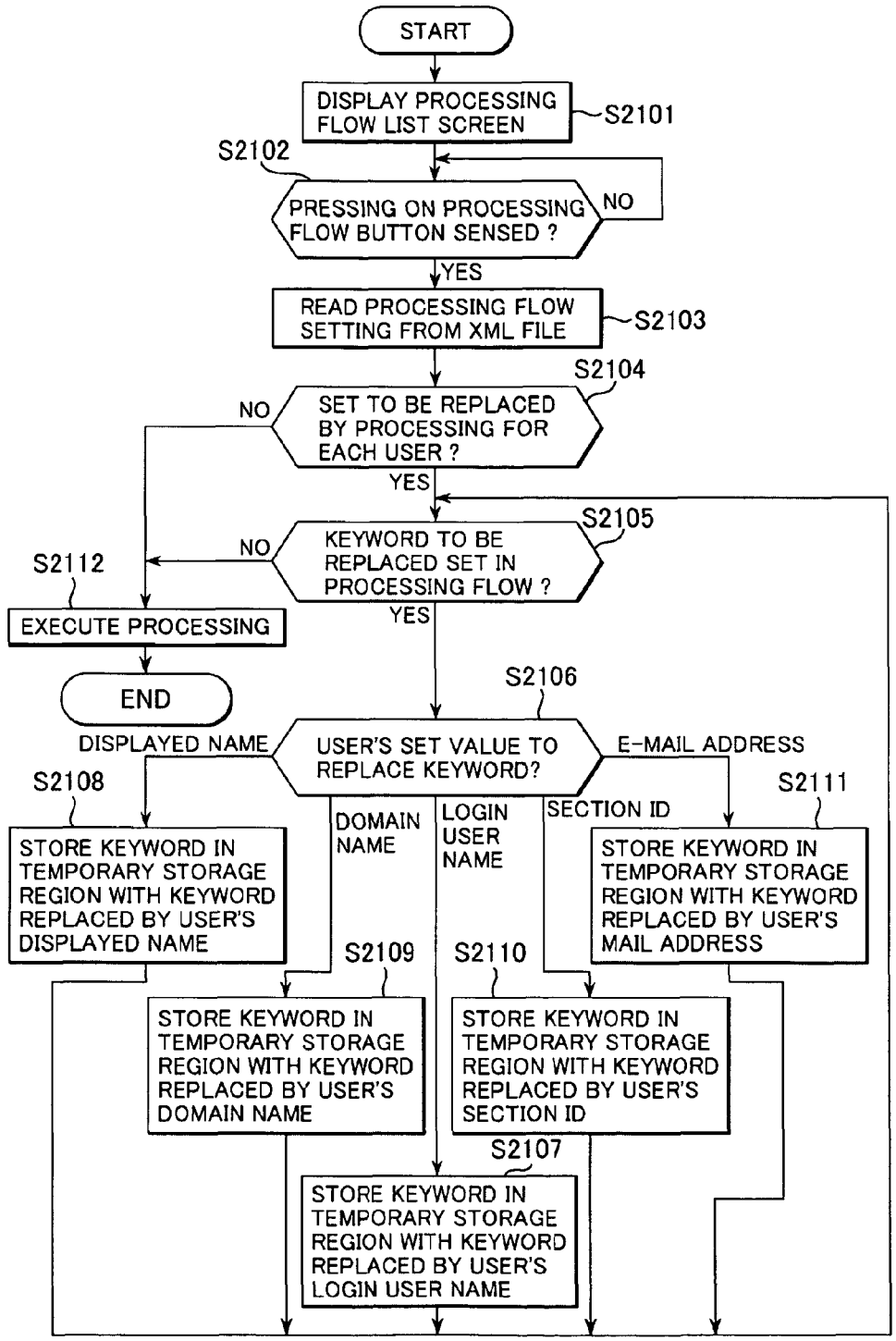

IMAGE PROCESSING APPARATUS, PROCESSING FLOW CONTROL METHOD, IMAGE FORMING SYSTEM, AND STORAGE MEDIUM

CROSS REFERENCE TO RELATED APPLICATION

This application is a continuation of U.S. application Ser. No. 12/344,926 filed on Dec. 29, 2008, the entire disclosure of which is incorporated by reference herein.

BACKGROUND OF THE INVENTION

1. Field of the Invention

The present invention relates to an image processing apparatus, a processing flow control method, an image processing system, and a storage medium that register and execute a plurality of operations or processes as a sequential processing flow, and more particularly, to a technique of personalizing and executing the processing flow for each user.

2. Description of the Related Art

Multifunctional peripherals having a scanner function, a printer function, a facsimile function, an E-mail transmission function, a file transmission function and the like as well as a copy function have been provided. The multifunctional peripherals can execute office processing using the copy function, the facsimile function or the like which is mainly applied to paper sheets and such processing of electronic documents as printing, transmitting or the like in cooperation with each other. Specifically, the multifunctional peripherals cannot only make a copy of a paper document but also transmit a scanned document to a personal computer or a file server as image data without printing out the document.

Now, the multifunctional peripherals are desired to have various functions cooperating with each other for executing a plurality of operations or processes as a sequential processing flow. For example, an image forming apparatus that can save a plurality of output setting data for an output format and can form and output an image according to the selected output setting data has been proposed (see Japanese Laid-Open Patent Publication (Kokai) No. H10-83263). An image forming apparatus that can provide a plurality of processes in cooperation with each other by setting values in a printer, a scanner or the like that is connected to a network of the image forming apparatus and cooperating the processes with each other instead of providing only the functions of the image forming apparatus in cooperation with each other has also been proposed (see Japanese Laid-Open Patent Publication (Kokai) No. 2004-287861).

However, the processing flows to be executed by the above-described image forming apparatuses are fixed, which requires a user to edit the processing flow each time to make a change in the processing flow, even if it is a slight change. When a user wants to transmit image data scanned by the multifunctional peripheral to a user's folder on a file server to save the image data, the user bothers to change the default destination of file transmission set in the processing flow to the user's desired destination. If too many users register their processing flows in the image forming apparatus in advance, it is troublesome for each user to find the own processing flow among all the processing flows. In addition, the more users register their processing flows in the image forming apparatus, the more system resources are consumed, which restricts the operation of the system.

SUMMARY OF THE INVENTION

The present invention has been made in view of the above-described problems and provides an image processing apparatus, a processing flow control method, an image forming system, and a storage medium that can reduce the number of processing flows and also reduce time and effort required by a user in searching a desired processing flow.

According to a first aspect of the present invention, there is proposed an image processing apparatus including an authentication unit adapted to execute user authentication, and an execution unit adapted to execute processing on image data with a plurality of processes as a sequential processing flow while cooperating a plurality of different functions with one another, comprising: an obtaining unit adapted to obtain setting data personalized for a user authenticated by the authentication unit; and a first registration unit adapted to register the plurality of processes as a sequential processing flow, wherein the execution unit is adapted to execute the processing flow with a part of the processing flow replaced by processing personalized for the user set in the setting data, upon executing the processing flow registered in the first registration unit.

According to a second aspect of the present invention, there is proposed a processing flow control method including an authentication step of executing user authentication, and an execution step of executing processing on image data with a plurality of processes as a sequential processing flow while cooperating a plurality of different functions with one another, comprising: an obtaining step of obtaining setting data personalized for a user authenticated in the authentication step; and a first registration step of registering the plurality of processes as a sequential processing flow, wherein the execution step comprises executing the processing flow with a part of the processing flow replaced by processing personalized for the user set in the setting data, upon executing the processing flow registered in the first registration step.

As a third aspect of the present invention, there is proposed an image processing system having an image processing apparatus and a server apparatus connected to the image processing apparatus, the image processing apparatus including an authentication unit adapted to execute user authentication, and an execution unit adapted to execute processing on image data with a plurality of processes as a sequential processing flow while cooperating a plurality of different functions with one another, comprising: an obtaining unit adapted to obtain setting data personalized for a user authenticated by the authentication unit; and a first registration unit adapted to register the plurality of processes as a sequential processing flow, wherein the execution unit is adapted to execute the processing flow with a part of the processing flow replaced by processing personalized for the user set in the setting data, upon executing the processing flow registered in the first registration unit.

As a fourth aspect of the present invention, there is proposed a computer-readable storage medium storing a program for causing a computer to implement a processing flow control method, the processing flow control method including an authentication step of executing user authentication, and an execution step of executing processing on image data with a plurality of processes as a sequential processing flow while cooperating a plurality of different functions with one another, comprising: an obtaining step of obtaining setting data personalized for a user authenticated in the authentication step; and a first registration step of registering the plurality of processes as a sequential processing flow, wherein the execution step comprises executing the processing flow with a part of the processing flow replaced by processing personalized for the user set in the setting data, upon executing the processing flow registered in the first registration step.

According to the present invention, it is possible to execute desired processing for each user by partially replacing a common processing flow by processing personalized for the user, thereby eliminating the need for a process of creating a processing flow for each user, which reduces resources to be consumed even when the number of users increases. Also, it is capable of reducing the number of the processing flows, thereby reducing time and effort required by the user in searching a desired processing flow.

Further features and advantages of the present invention will become apparent from the following detailed description of exemplary embodiments with reference to the attached drawings.

BRIEF DESCRIPTION OF THE DRAWINGS

FIG. 8 is a view showing an exemplary input screen for a user name and password displayed on the LCD display unit when a user is logging in.

FIG. 21 is a flowchart showing the procedure of processing flow executing processing executed by the image processing apparatus according to a third embodiment of the present invention.

DETAILED DESCRIPTION OF THE PREFERRED EMBODIMENTS

Embodiments of the present invention will now be described in detail with reference to the drawings.

Figure 1:
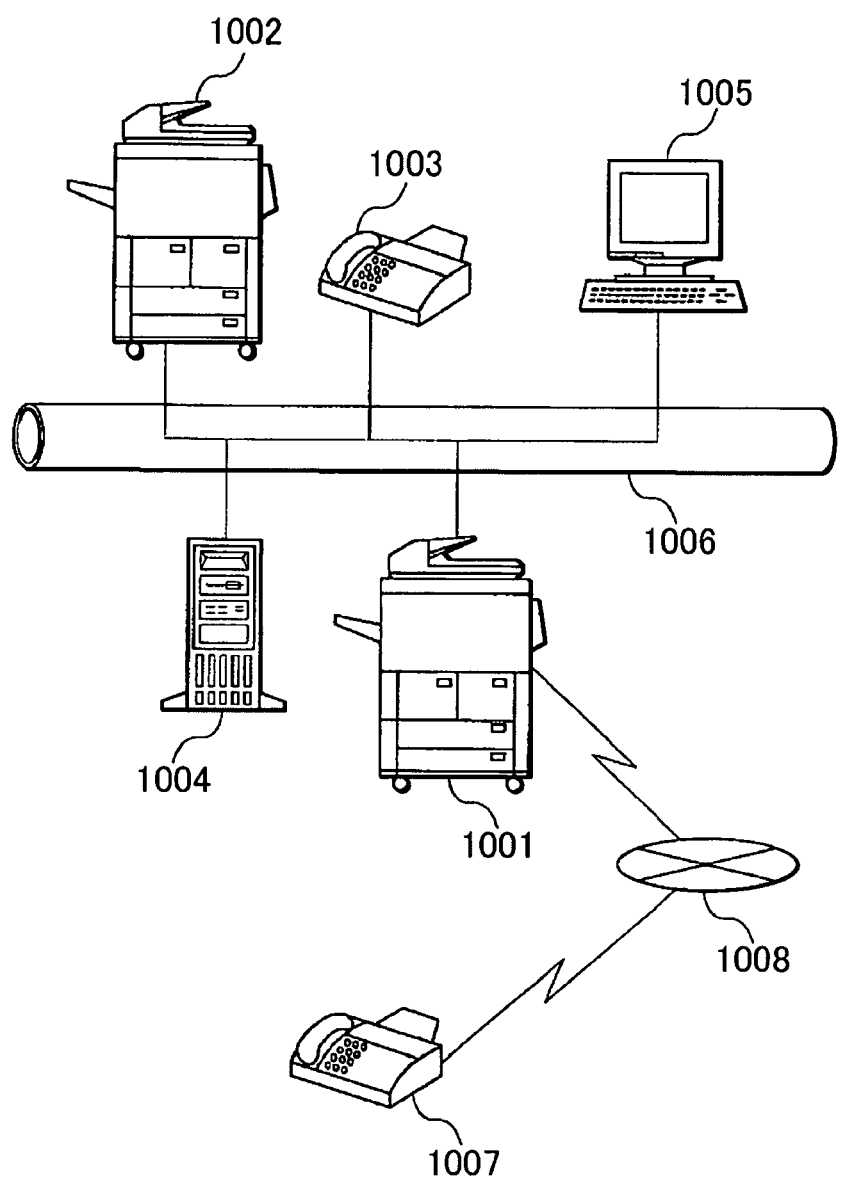
FIG. 1 is a view showing an exemplary arrangement of an image forming system including an image processing apparatus according to a first embodiment of the present invention.

FIG. 1 is a view showing an exemplary arrangement of an image forming system including an image processing apparatus according to a first embodiment of the present invention.

In FIG. 1, the image processing system includes multifunctional peripherals 1001 and 1002, each of which serves as the image processing apparatus according to the embodiment; a facsimile machine 1003; a database-mail server-directory service (hereinafter simply referred to as "the directory service") 1004; and a client computer 1005, which are interconnected via a LAN 1006 that comprises Ethernet (trademark) or the like. The multifunctional peripheral 1001 is equivalent in function to the multifunctional peripheral 1002.

The multifunctional peripheral 1001 is connected to a facsimile machine 1007 via a public line 1008 (WAN). The multifunctional peripheral 1001 has a copy function, a facsimile function, a scanner function, and also a data transmission function for transmitting image data obtained by scanning an original to the respective apparatuses on the LAN 1006. The multifunctional peripheral 1001 has a PDL (Page Description Language) function and can receive and print PDL data received from the client computer 1005 or the like on the LAN 1006.

The multifunctional peripheral 1001 can store image data obtained by scanning an original and PDL data received from the client computer 1005 or the like in a specified box region in an HDD (hard disk drive) 2004 shown in FIG. 2, to be described later. The multifunctional peripheral 1001 can also print the data stored in the box region.

The multifunctional peripheral 1001 can receive image data obtained by the multifunctional peripheral 1002 scanning an original via the LAN 1006, store the image data in an HDD 2004 and print out the image data. The multifunctional peripheral 1001 can also receive data from the directory service 1004 via the LAN 1006, store the data in the HDD 2004 and print out the data.

The facsimile machine 1003 can receive image data obtained by the multifunctional peripheral 1001 scanning an original via the LAN 1006, and facsimileing send the received image data to another apparatus. The facsimile machine 1007 can FAX receive image data obtained by the multifunctional peripheral 1001 scanning an original via the public line 1008, and print out the received image data.

The directory service 1004 is a server for providing a directory service with an E-mail transmission and reception function. The directory service 1004 can receive image data obtained by the multifunctional peripheral 1001 scanning an original via the LAN 1006 and store the image data in a database.

The client computer 1005 can connect to the directory service 1004 via the LAN 1006, obtain desired data from the directory service 1004 and display the data. The client computer 1005 can receive image data obtained by the multifunctional peripheral 1001 scanning an original via the LAN 1006, process and edit the image data. The client computer 1005 can also connect to the multifunctional peripheral 1001 via the LAN 1006 and set various values in the multifunctional peripheral 1001.

Figure 2:
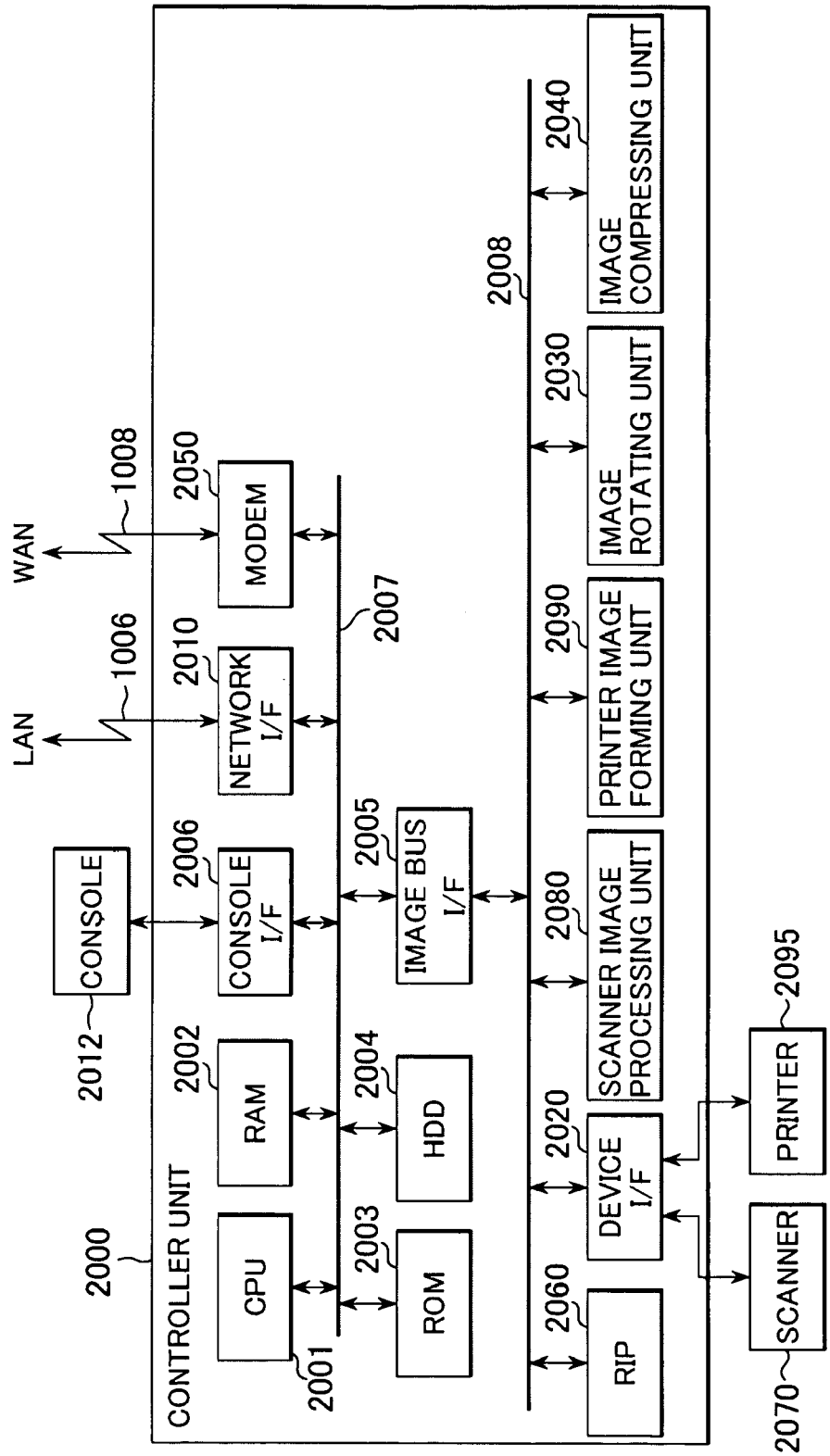
FIG. 2 is a block diagram showing an arrangement of the multifunctional peripheral shown in FIG. 1.

FIG. 2 is a block diagram showing an arrangement of the multifunctional peripheral 1001 shown in FIG. 1. The multifunctional peripheral 1002 has the same arrangement as that of the multifunctional peripheral 1001.

The multifunctional peripheral 1001 has a controller unit 2000. The controller unit 2000 is connected with a scanner 2070, an image input device, and a printer 2095, an image output device, and also a console 2012.

The controller unit 2000 controls the copy function of the printer 2095 printing out image data scanned by the scanner 2070. The controller unit 2000 is connected to the LAN 1006 or the public line 1008 and controls input and output of image data or various setting data.

The controller unit 2000 has a CPU 2001, a RAM 2002, a ROM 2003, and an HDD 2004. The CPU 2001 boots an operation system (OS) by a boot program stored in the ROM 2003, and executes an application program stored in the HDD 2004. As a result, various types of processing are executed. The CPU 2001 uses the RAM 2002 as a work area. The RAM 2002 provides the work area as well as an image memory area for temporally storing image data. The HDD 2004 stores the above-described application program and image data.

The CPU 2001 is connected to the ROM 2003, the RAM 2002, and a console I/F (console interface) 2006 via a system bus 2007. The CPU 2001 is also connected to a network I/F (network interface) 2010, a modem 2050, and an image bus I/F (image bus interface) 2005 via the system bus 2007.

The console I/F 2006 is an interface for connecting with the console 2012 that has predetermined keys, buttons and a touch panel. The console I/F 2006 outputs, to the console 2012, image data to be displayed on the console 2012. The console I/F 2006 sends out, to the CPU 2001, information input by a user on the console 2012.

The network I/F 2010 is connected to the LAN 1006, and inputs and outputs information to and from the respective apparatuses on the LAN 1006. The modem 2050 is connected to the public line 1008 (WAN), and inputs and outputs information via the public line 1008.

The image bus I/F 2005 is a bus bridge that connects to each other the system bus 2007 and an image bus 2008 transferring image data at high speed, and transfers data format. The image bus 2008 comprises a PCI bus or an IEEE1394. To the image bus 2008 are connected a raster image processor (hereinafter referred to as "the RIP") 2060, a device I/F 2020, a scanner image forming unit 2080, a printer image forming unit 2090, an image rotating unit 2030, and an image compressing unit 2040.

The RIP 2060 is a processor for rasterizing a PDL code into a bitmap image. To the device I/F 2020 is connected the scanner 2070 and the printer 2095. The device I/F 2020 performs synchronous or asynchronous conversion on image data. The scanner image forming unit 2080 corrects, processes and edits image data obtained by the scanner 2070 scanning an original. The printer image forming unit 2090 performs correction and resolution conversion on image data according to the performance of the printer 2095. The image rotating unit 2030 rotates image data if required. The image compressing unit 2040 applies JPEG compression and decompression processing to multi-valued image data, and compression and decompression processing of JBIG, MMR, or MH to binary image data.

Figure 3:
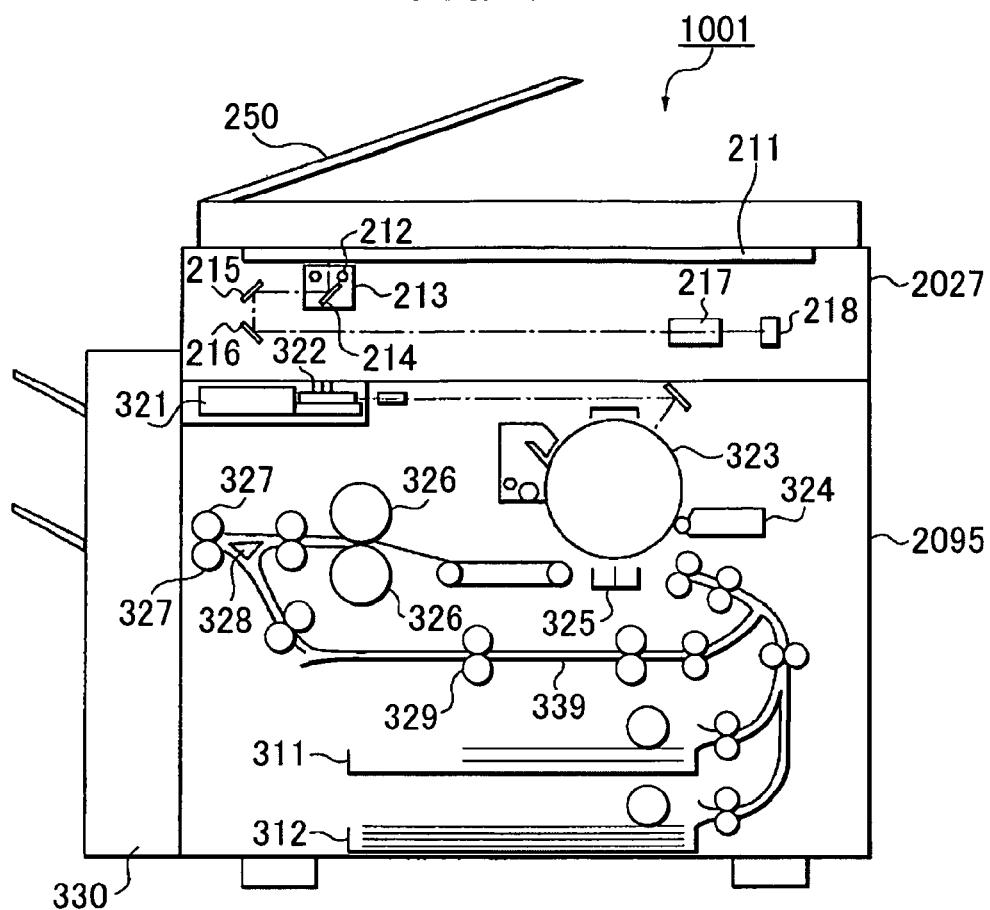
FIG. 3 is a view schematically showing a hardware arrangement of the multifunctional peripheral shown in FIG. 1.

FIG. 3 is a view schematically showing a hardware arrangement of the multifunctional peripheral 1001.

As shown in FIG. 3, the scanner 2070 and the printer 2095 are integrated into the multifunctional peripheral 1001.

The scanner 2070 has a document feeding unit 250 mounted therein. The document feeding unit 250 feeds originals one by one to a platen glass 211. Whenever a scanning operation on one of the originals is terminated, the scanner 2070 outputs the original from the platen glass 211 to an original tray (not shown). When the original is fed to the platen glass 211, the scanner 2070 lights a lamp 212 and starts moving a moving unit 213. The original on the platen glass 211 is scanned as the moving unit 213 moves. During the scanning, light reflected from the original is transmitted to a CCD image sensor (hereinafter referred to as "the CCD") 218 through respective mirrors 214, 215, 216, and a lens 217. The image on the original is formed on an image forming surface of the CCD 218. The CCD 218 converts the image formed on the image forming surface into electrical signals. After subjected to predetermined processing, the electrical signals are input to the scanner image forming unit 2080 (see FIG. 2) as image data.

The printer 2095 has a laser driver 321. The laser driver 321 drives a laser emitting unit 322 based on the image data input from the printer image forming unit 2090 (see FIG. 2). Then, the laser emitting unit 322 emits a laser beam according to the image data, which laser beam is irradiated to a photosensitive drum 323 while being scanned. An electrostatic latent image is formed on the photosensitive drum 323 by the irradiated laser beam. The electrostatic latent image is visualized as a toner image by toner fed from a developing unit 324. In synchronization with the laser beam irradiation, a transfer sheet is fed from each of cassettes 311 and 312 to a position between the photosensitive drum 323 and a transferring unit 325 along a conveying route. Then, the toner image on the photosensitive drum 323 is transferred to a recording sheet fed by the transferring unit 325.

The recording sheet bearing the transfer image is conveyed to a pair of fixing rollers (heating roller and pressing roller) 326 by a conveyer belt. The pair of fixing rollers 326 apply heat and pressure to the recording sheet to fix the toner image on the recording sheet. The recording sheet having passed through the pair of fixing rollers 326 is discharged to a discharge unit 330 by a pair of discharging rollers 327. The discharge unit 330 comprises a sheet processing device that can perform post processing such as sorting and stapling on the transfer sheets.

When the double-sided recording mode is set, the recording sheet is conveyed to the pair of discharging rollers 327, and then the direction of the rotation of the pair of discharging rollers 327 is inversed, and the recording sheet is directed to a re-feeding route 339 by a flapper 328. The recording sheet directed to the re-feeding route 339 is re-fed to the position between the photosensitive drum 323 and the transferring unit 325 at the above-described timing. Then, the toner image is transferred to a rear surface of the recording sheet.

Figure 4:
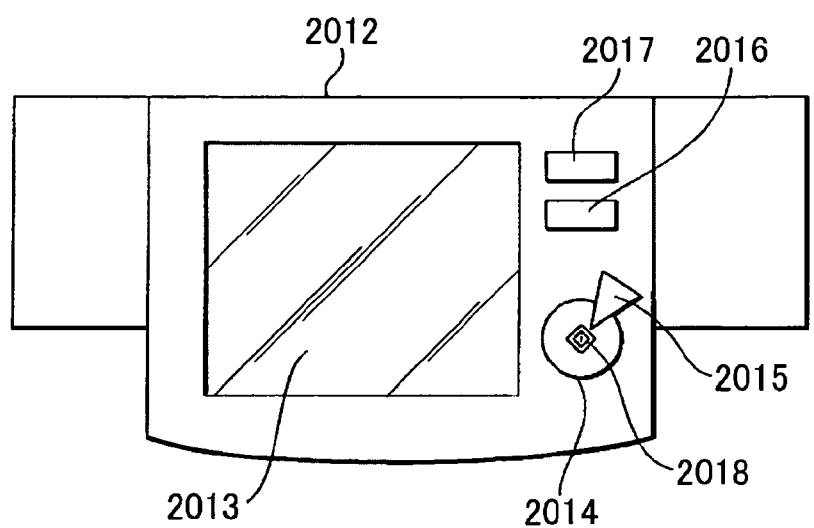
FIG. 4 is a plan view schematically showing the console shown in FIG. 2.

FIG. 4 is a plan view schematically showing the console 2012 shown in FIG. 2.

An LCD display unit 2013 is prepared by adhering a touch panel sheet on an LCD and displays an operation screen of the multifunctional peripheral 1001. When a software key in the screen is pressed, the LCD display unit 2013 informs the CPU 2001 in the controller unit 2000 of the position information of the key. The start key 2014 is used to start, for example, the scanning operation of an original image. The central portion of the start key 2014 includes a two-color (green and red) LED 2018, which color indicates whether or not the start key 2014 is ready to use. The stop key 2015 is used to stop the operation being performed. An ID key 2016 is used to input the user ID of the user. A reset key 2017 is used to initialize settings from the console 2012.

Figure 5:
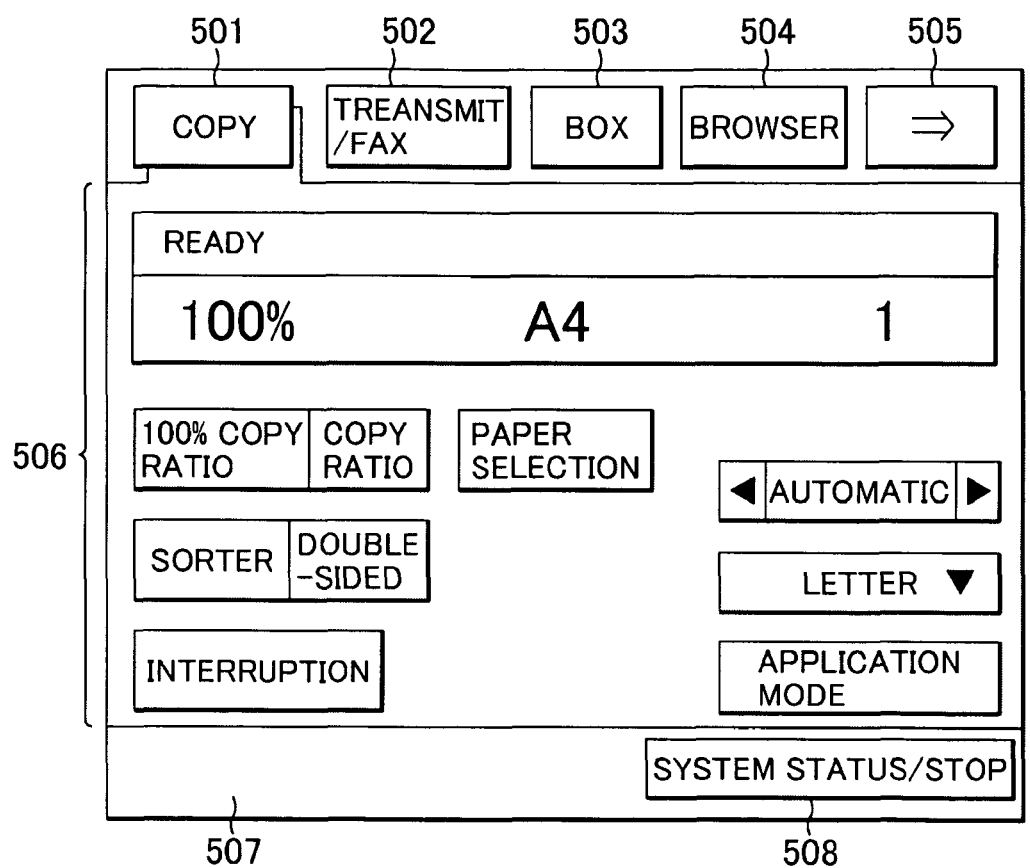
FIG. 5 is a view showing an exemplary operation screen displayed on the LCD display unit shown in FIG. 4.

FIG. 5 is a view showing an exemplary operation screen displayed on the LCD display unit 2013 shown in FIG. 4.

In the upper part of the operation screen displayed on the LCD display unit 2013, such software keys as a copy tab 501, a transmission/facsimile tab 502, a box tab 503, a browser tab 504, and a right arrow tab 505 are arranged for the user to select the respective functions. The example shown in FIG. 5 represents an initial screen for the copy function displayed when the copy tab 501 is pressed.

In the example shown in FIG. 5, information on the copy function is displayed in a display region 506. The part currently displaying "Ready" displays a status that should be indicated for the copy function. Under the status, the copy ratio, the selected paper deck, and a copy quantity are displayed. In the display region 506, software keys for setting the operation mode of the copy function such as a 100% copy ratio, other copy ratios, sheet selection, sorter, double-sided, interruption, letter, left and right arrow keys for adjusting thickness, and an automatic key for automatically adjusting thickness are arranged. When an application mode key is pressed, a screen for specifying operation modes that cannot be displayed on the initial window is displayed in the display region 506 in layers.

A display region 507 is for displaying a status of the multifunctional peripheral 1001. The display region 507 displays, for example, an alarm message indicating "jam" and a status message indicating that PDL print is underway while the multifunctional peripheral 1001 is performing the PDL printing. The display region 507 also displays a system status/stop software key 508. When the system status/stop software key 508 is pressed, a screen for displaying device information and a screen for displaying the print job status for the multifunctional peripheral 1001 (not shown) are displayed. The user can operate to execute or stop a job on the screen.

When the transmission/facsimile tab 502 is pressed, the screen shown in FIG. 5 switches to a screen for setting transmission/facsimile functions (not shown). On the screen for setting transmission/facsimile functions, the user can operate to send, by E-mail transmission, FTP transmission, or facsimileing via the public line 1008, the image data obtained by the multifunctional peripheral 1001 scanning an original to an apparatus on the LAN 1006.

Similarly, when the box tab 503 is pressed, the screen shown in FIG. 5 switches to a screen for setting box tab functions (not shown). On the screen for setting box tab functions, the user can operate to save the image data obtained by the multifunctional peripheral 1001 scanning a document in a box region in the HDD 2004 or cause image data stored in the box region to be printed while being specified. According to the user's operation, a setting screen for transmitting image data to an apparatus on the LAN 1006 (not shown) is also displayed.

Similarly, when the browser tab 504 is pressed, the screen shown in FIG. 5 switches to a screen for setting browser functions (not shown). On the screen for setting browser functions, the user can operate to display the HTML contents obtained from a Web server. On the screen, the user can also operate to print the displayed contents.

When the multifunctional peripheral 1001 has five or more functions, the right arrow tab 505 is displayed to the right of the browser tab 504. When the right arrow tab 505 is pressed, the tabs indicating the functions other than the four functions displayed in the screen among the five or more functions of the multifunctional peripheral 1001 are displayed.

Now, an application program for controlling a processing flow according to the embodiment will be outlined. The user can select the application program as the fifth function by pressing the right arrow tab 505, for example. The application program is executed by the CPU 2001.

The application program is for streamlining stereotyped operations that are performed with the functions of the multifunctional peripheral 1001. The application program can reuse the same setting by preparing and registering a combination of a plurality of functions as a processing flow. For example, a sequence of operations of printing image data obtained by scanning an original and a cover-relevant document stored in a box region while being combined with each other can be registered as a processing flow.

A processing flow to be registered comprises three processes of "input", "editing", and "output". The input process is to set a method for inputting a document to be processed in the processing flow. In this instance, the input process which can be set includes an "original scanning" process and a "box document" process. Setting of the "original scanning" process enables to scan an original in a preset scanning setting to make the obtained image data as an input document. Setting of the "box document" process enables to select a document stored in the box region as an input document. The editing process is to set a method for editing the document selected in the input process. The editing process can be skipped without any items set. In this instance, the editing process may include a "document combining" process, a "page deleting" process, and an "image displaying" process.

Setting of the "document combining" enables a plurality of documents selected in the input process to be combined in a specified order. Setting of the "page deleting" process enables to delete a page specified in a document selected in the input process or in a document combined at the editing process. Setting of the "image displaying" process enables to display an image of a document selected in the input process or a document edited in the editing process on the LCD display unit 2013, followed by the process proceeding to the output process. The output process is to set a method for outputting a document selected in the input process or a document edited in the editing process. In this instance, the output process may include a "storing-in-box" process, a "transmitting" process, and a "printing" process.

Setting of the "storing-in-box" process enables a document selected in the input process or a document specified in the editing process to be stored in a specified box region. Setting of the "transmitting" process enables a document selected in the input process or a document specified in the editing process to be transmitted in a specified way. Setting of the "printing" process enables a document selected in the input process or a document specified in the editing process to be printed in a specified setting.

Respective settings made for the processing flow are stored in XML (Extensible Markup Language) syntax and registered as the processing flow. Then, the registered processing flow is displayed as an optional button for the user. When the CPU 2001 senses that the processing flow button is pressed, the CPU 2001 reads the processing flow information from the XML file and proceeds to execute the processing while analyzing the content of the processing flow.

Figure 6:
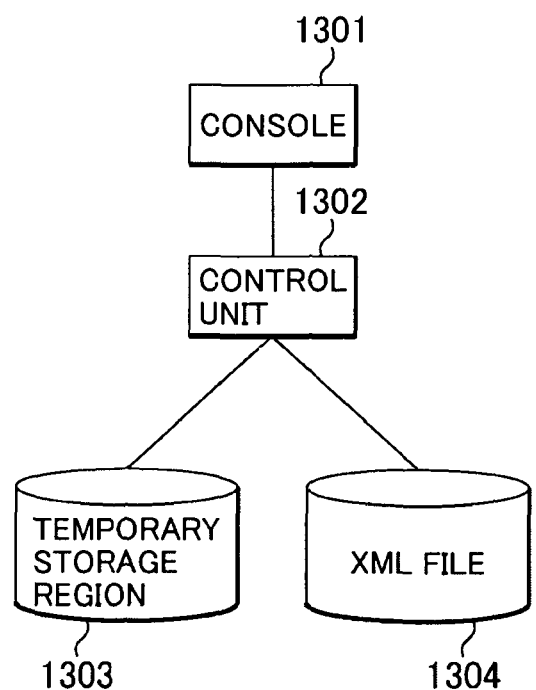
FIG. 6 is a view showing an arrangement of functional units of the multifunctional peripheral shown in FIG. 1 that provide processing flow control.

FIG. 6 is a view showing an arrangement of functional units of the multifunctional peripheral 1001 shown in FIG. 1 that provide processing flow control.

In FIG. 6, a console 1301 corresponds to the console 2012 shown in FIG. 2, a control unit 1302 corresponds to the controller unit 2000 shown in FIG. 2, and a temporary storage region 1303 corresponds to the RAM 2002. An XML file 1304 defines a processing flow stored in the HDD 2004. When an instruction to allow an application program to control a processing flow is input from the console 1301, the control unit 1302 displays an operation window for the application program (to be described later) on the LCD display unit 2013. Then, the control unit 1302 executes the application program in the temporary storage region 1303 reserved in the RAM 2002. In this instance, let it be assumed that the application program is stored in the HDD 2004. The control unit 1302 analyzes setting information of the application program and the content of the processing flow with reference to the XML file 1304 that defines the processing flow stored in the HDD 2004. The control unit 1302 controls execution of the processing flow by analyzing setting data for each user that is stored in the temporary storage region 1303 according to the definition of the XML file 1304.

A description will now be given of the procedure of user authentication (login) processing in the image forming system shown in FIG. 1, with reference to FIG. 7 and FIG. 8. In the embodiment, let it be assumed that the user logs in to the directory service, which is a server, from the multifunctional peripheral 1001.

Figure 7:
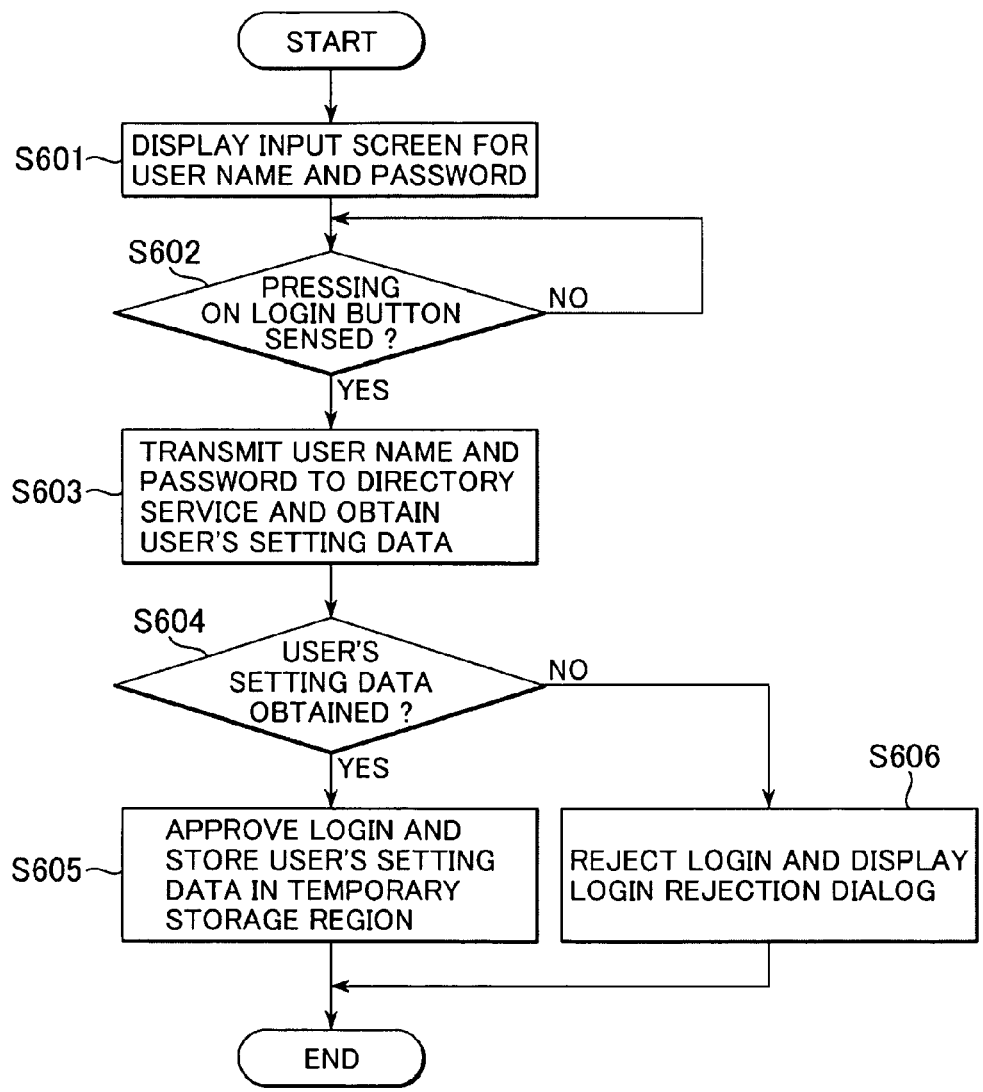
FIG. 7 is a flowchart showing the procedure of login processing executed by the multifunctional peripheral shown in FIG. 1.

FIG. 7 is a flowchart showing the procedure of login processing executed by the multifunctional peripheral 1001 shown in FIG. 1. FIG. 8 is a view showing an exemplary input screen for a user name and password displayed on the LCD display unit 2013 when the user is logging in.

Figure 8:
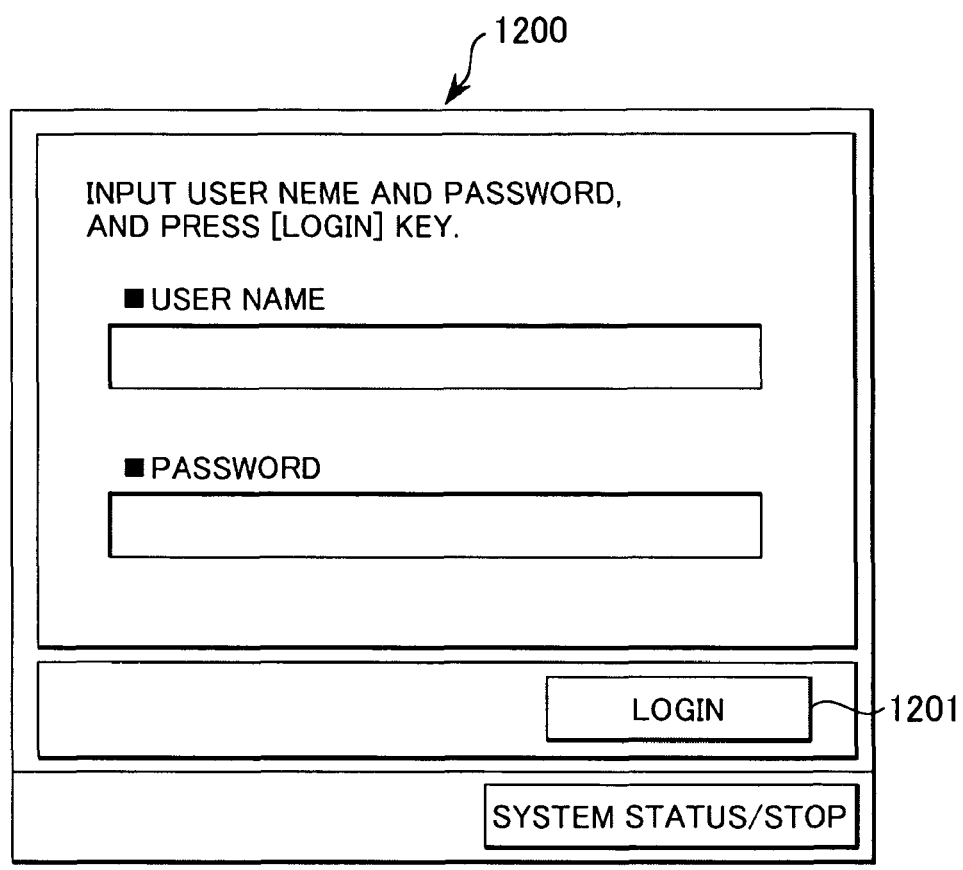

When the user logs in from the multifunctional peripheral 1001, the multifunctional peripheral 1001 displays an input screen 1200 for inputting a user name and password as shown in FIG. 8 prior to the initial screen shown in FIG. 5. In the embodiment, let it be assumed that the user cannot use the functions of the multifunctional peripheral 1001 until the user is authenticated.

Referring to FIG. 7, in step S601, the CPU 2001 displays the input screen 1200 for the user name and password as shown in FIG. 8 on the LCD display unit 2013, waiting for data to be input. When the CPU 2001 senses that the user name and password are input and a login button 1201 is pressed (YES to step S602), the program proceeds to step S603. In the step S603, the CPU 2001 transmits the input user name and password to the directory service 1004 via the LAN 1006 and obtains the setting data for each user stored in the directory service 1004.

In step S604, the CPU 2001 determines whether or not the setting data for each user can be obtained. As a result of the determination, when the setting data for each user can be obtained, the program proceeds to step S605, where the CPU 2001 causes the temporary storage region 1303 shown in FIG. 6 to store the setting data for each user. If the setting data for each user cannot be obtained, the program proceeds to step S606, where the CPU 2001 causes the LCD display unit 2013 to display a login rejection dialog and switch the screen to the input window 1200. The "setting data for each user" described here refers to user's personal information including the user's login name, section to which the user belongs, E-mail address, processing personalized for the user described in character strings in XML syntax or the like.

A description will now be given of the procedure of login processing executed by the directory service 1004 shown in FIG. 1 with reference to FIG. 9.

Figure 9:
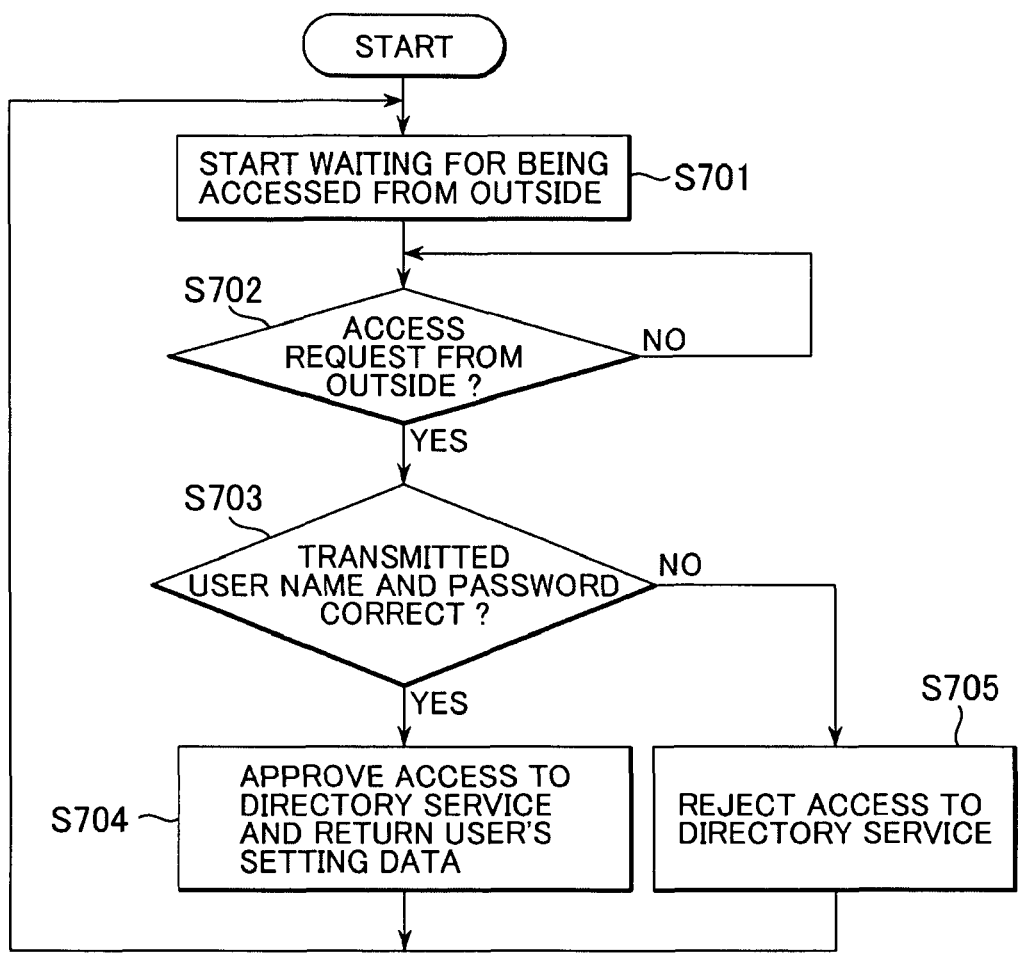
FIG. 9 is a flowchart showing the procedure of login processing executed by the directory service shown in FIG. 1.

FIG. 9 is a flowchart showing the procedure of login processing executed by the directory service 1004 shown in FIG. 1.

Referring to FIG. 9, in step S701, a CPU (not shown) in the directory service 1004 starts waiting for being accessed from the outside. When the CPU in the directory service 1004 senses that an access request from the outside is received (YES to step S702), the CPU determines whether or not the transmitted user name and password are correct (step S703). As a result of the sensing, when the CPU determines that the user name and password are correct (YES to step S703), the CPU grants access to the directory service 1004 and returns the setting data for each user (step S704). If the CPU determines that the user name and password are not correct (NO to step S703), the CPU rejects access to the directory service 1004 (step S705). After a series of the processing has been terminated, the program returns to the step S701.

A description will now be given of the procedure of processing flow registering processing executed by the multifunctional peripheral 1001 shown in FIG. 1, with reference to FIG. 8 to FIG. 15. The registration of the processing flow is an action to register a plurality of operations or processes as a sequential processing flow so that the multifunctional peripheral 1001 executes the various functions thereof by cooperating the functions each other in the image forming system shown in FIG. 1. Moreover, processes described hereinafter are directed to the processing executed after the user has been authenticated in the above-described login processing.

Figure 10:
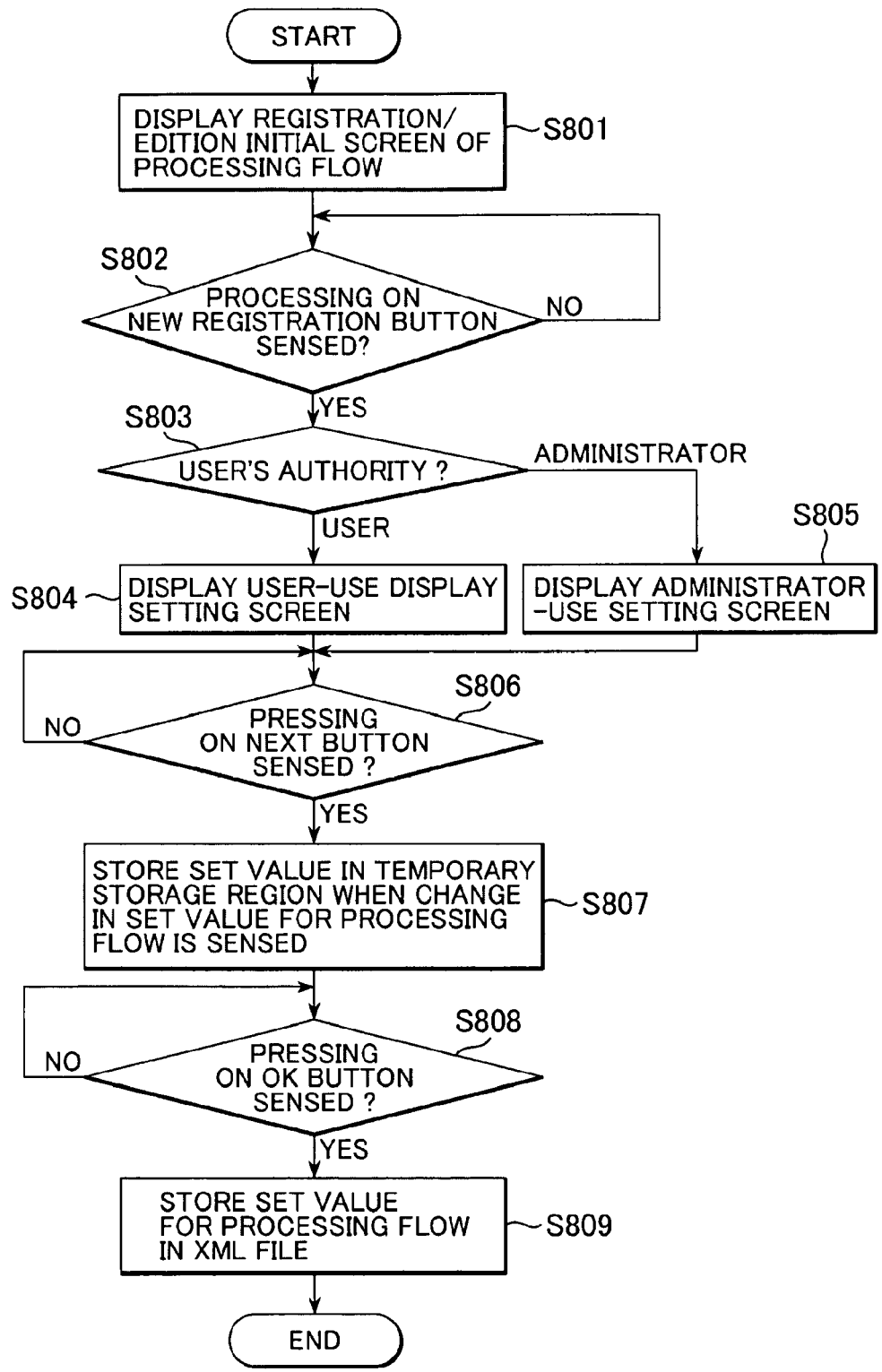
FIG. 10 is a flowchart showing the procedure of processing flow registering processing in the multifunctional peripheral shown in FIG. 1.
Figure 11:
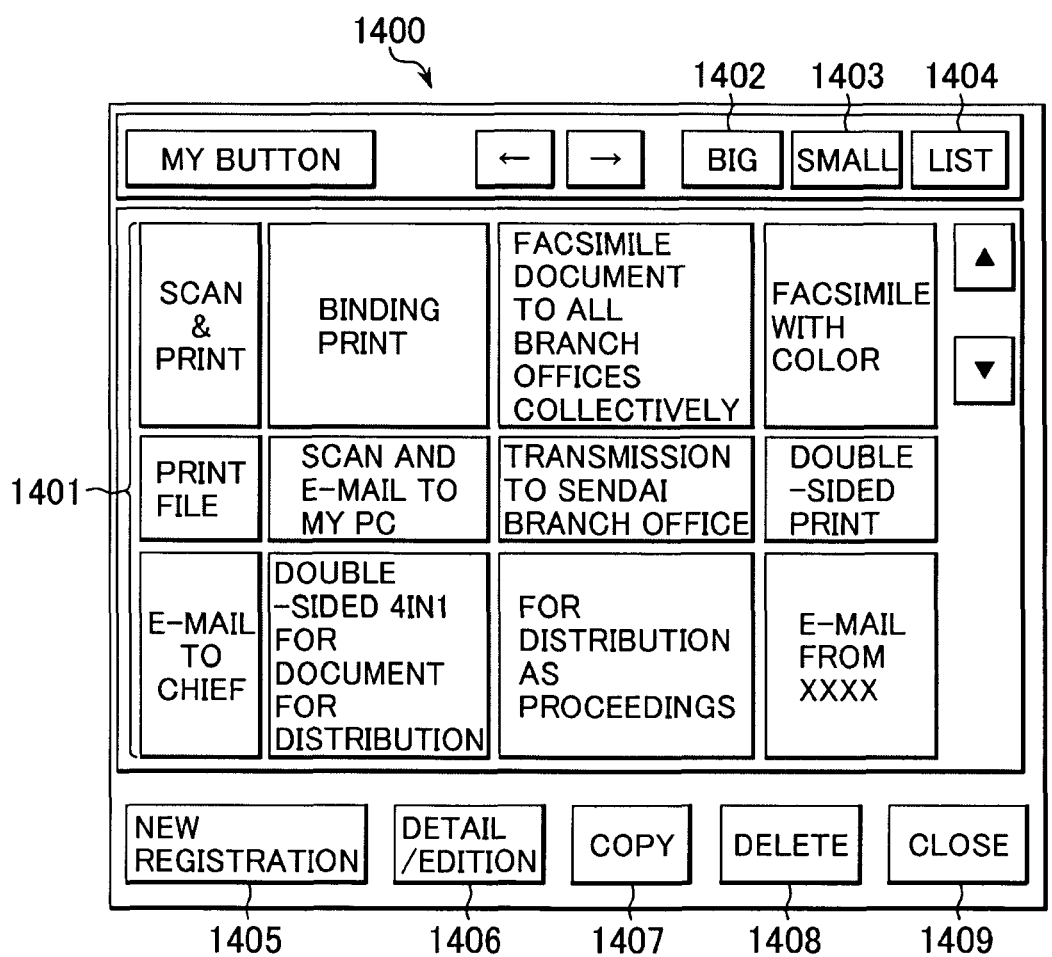
FIG. 11 is a view showing an exemplary processing flow registration/edition initial screen displayed on the LCD display unit when the processing flow is registered as shown in FIG. 10.
Figure 12:
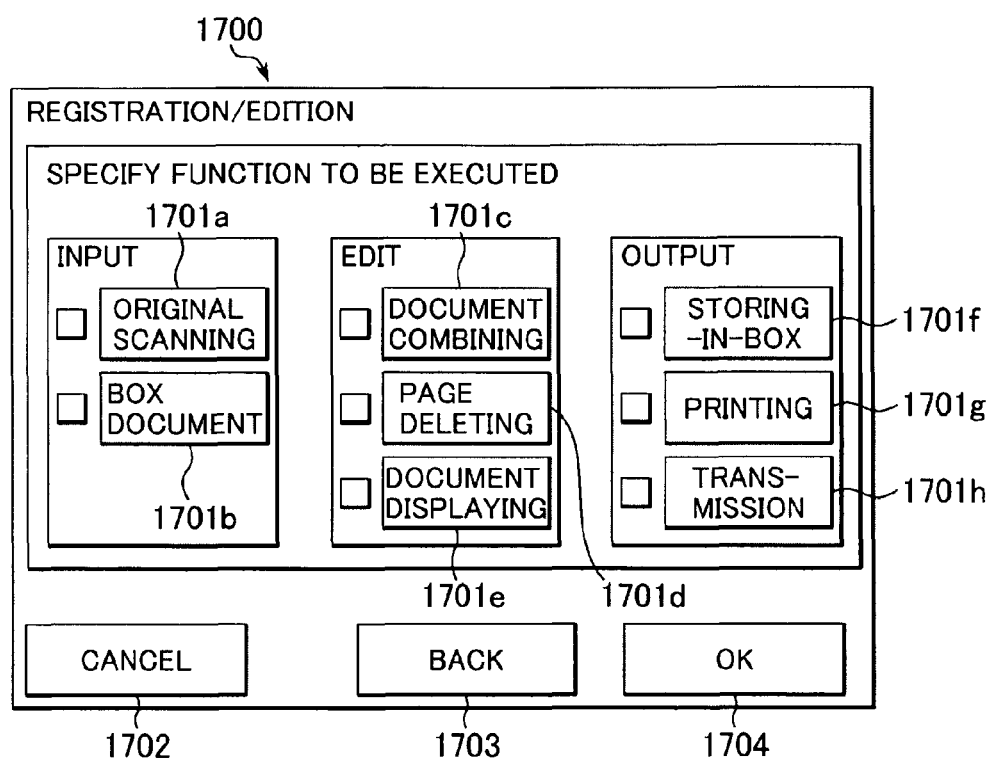
FIG. 12 is a view showing an exemplary processing flow registration/edition screen displayed on the LCD display unit.
Figure 13:
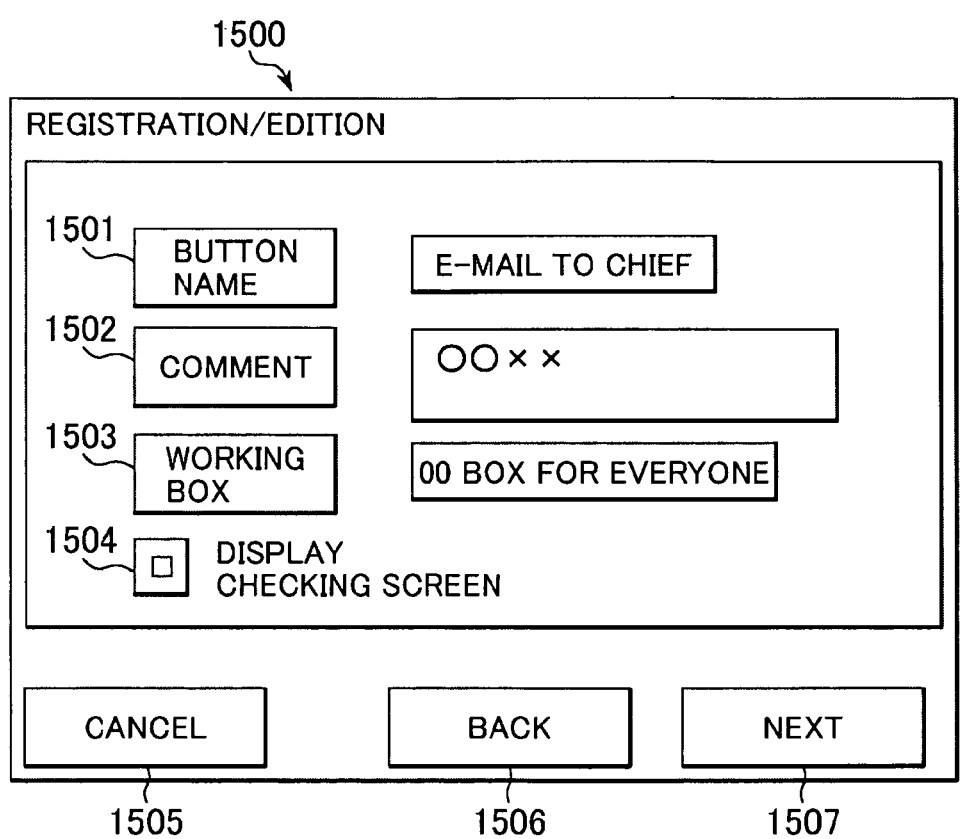
FIG. 13 is a view showing an exemplary registration/edition screen for a user.
Figure 14:
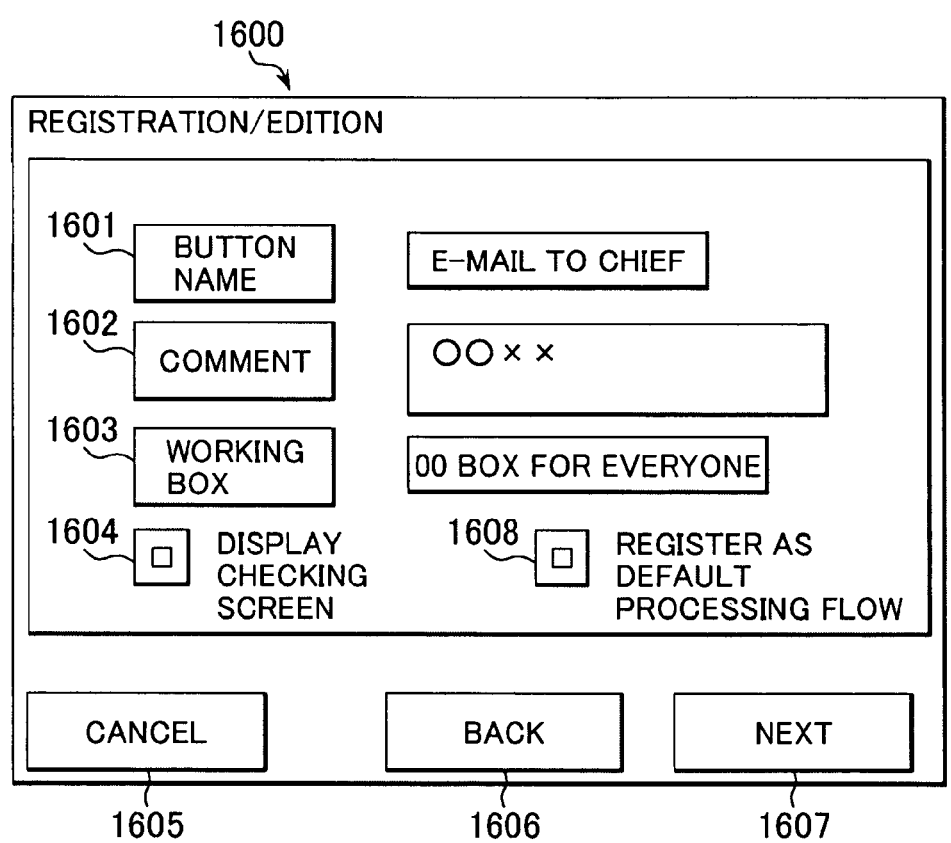
FIG. 14 is a view showing an exemplary registration/edition screen for an administrator.
Figure 15:
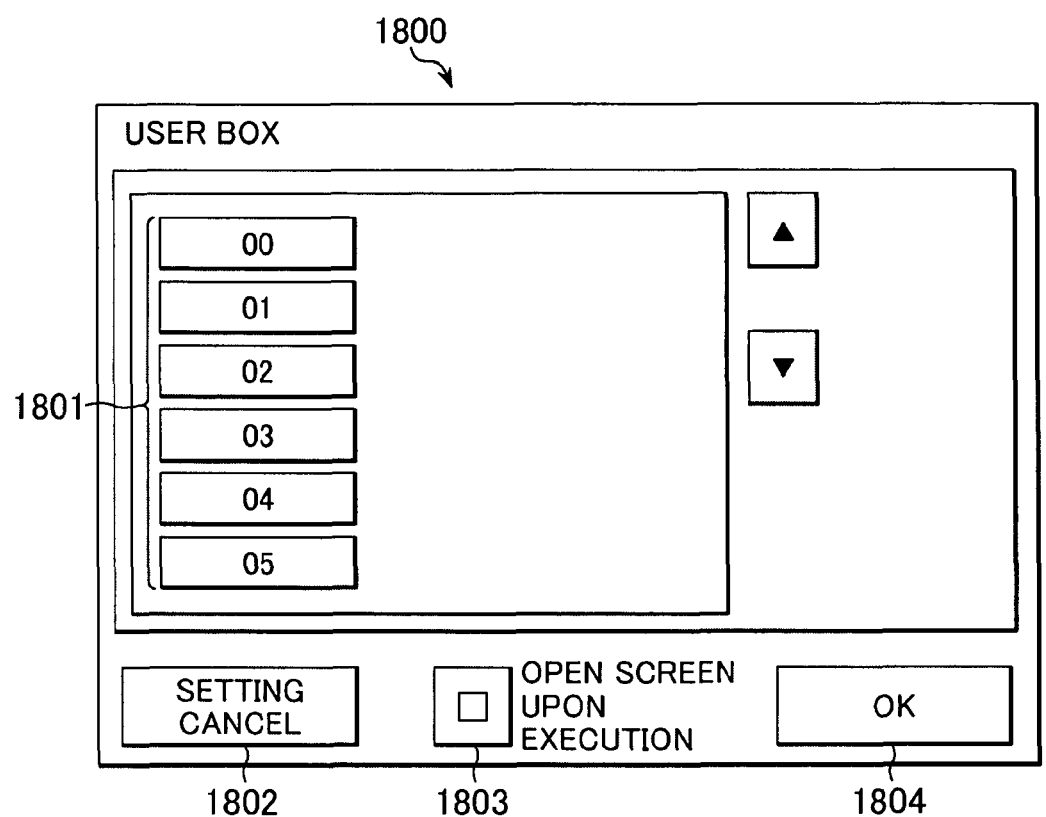
FIG. 15 is a view showing an exemplary processing flow setting screen displayed whenever any of the function buttons shown in FIG. 12 is pressed.

FIG. 10 is a flowchart showing the procedure of processing flow registering processing executed by the multifunctional peripheral 1001 shown in FIG. 1. FIG. 11 is a diagram showing an exemplary processing flow registration/edition initial screen displayed on the LCD display unit 2013 when the processing flow is registered as shown in FIG. 10. FIG. 12 is a view showing an exemplary processing flow registration/edition screen displayed on the LCD display unit 2013. FIG. 13 is a view showing an exemplary registration/edition screen for a user. FIG. 14 is a view showing an exemplary registration/edition screen for an administrator. FIG. 15 is a view showing an exemplary processing flow setting screen displayed whenever any one of the function buttons shown in FIG. 12 is pressed.

In step S801, the CPU 2001 causes a processing flow registration/edition initial screen shown in FIG. 11 to display processing flow buttons 1401 corresponding to processing flows stored in the XML file 1304. The style of displaying the processing flow buttons 1401 can be switched among three patterns of large display, small display, and list display by pressing any one of a big button 1402, a small button 1403, and a list button 1404.

In the embodiment, in a registration/edition screen 1700 shown in FIG. 12, each of original scanning, box document, document combining, page deleting, document displaying, storing-in-box, printing, and transmission allocated to each of function buttons 1701a to 1701h is treated as a unit of "process".

In step S802, the CPU 2001 senses whether either a detail/edition button 1406 or a copy button 1407 is pressed when either a new registration button 1405 or one of the processing flow buttons 1401 is selected in a processing flow registration/edition initial window 1400. When either of the buttons is pressed, the CPU 2001 checks the user's authority in the setting data for each user stored in the temporary storage region 1303 (step S803). As a result of the checking, when the user's authority is assigned to a user, the CPU 2001 causes the LCD display unit 2013 to display a use-use registration/edition screen 1500 shown in FIG. 13. Then, the CPU 2001 receives input of information including a button name, a comment, a working box, and whether or not to display a checking screen in the user-use registration/edition screen 1500 (step S804). In the example shown in the figure, the button name 1501 has input of "E-mail to chief", the comment 1502 has input of "XXXX", and the working box 1503 has input (or selection) of "00 box for everyone". When a button for displaying the checking screen 1504 is selected, the checking screen is displayed before the processing flow is executed. On the user-use registration/edition screen 1500 are arranged a cancel button 1505, back button 1506, and next button 1507.

When the user's authority in the setting data for each user stored in the temporary storage region 1303 is assigned to an administrator in the step S803, the CPU 2001 causes the LCD display unit 2013 to display an administrator-use registration/ edition screen 1600 shown in FIG. 14. Then, the CPU 2001 receives input of information including a button name, a comment, a working box, and whether or not to display a checking screen in the administrator-use registration/edition screen 1600 (step S805). In the example shown in the figure, the button name 1601 has input of "E-mail to chief", the comment 1602 has input of "XXXX", and the working box 1603 has input (or selection) of "00 box for everyone". When a button for displaying the checking screen 1604 is selected, the checking screen is displayed before the processing flow is executed. When a register as a default processing flow button 1608 is selected, the processing flow to be made can be registered as a default processing flow (second registering unit). On the administrator-use registration/edition screen 1600 are arranged a cancel button 1605, a back button 1606, and a next button 1607.

When the CPU 2001 senses that a delete button 1408 is pressed in the processing flow registration/edition initial screen 1400 in step S802, the CPU 2001 deletes the processing flow selected by the processing flow button 1401 from the XML file 1304.

Then, the CPU 2001 senses whether or not either the next button 1507 in the user-use registration/edition screen 1500 or the next button 1607 in the administrator-use registration/ edition screen 1600 is pressed (step S806). When either of the buttons is pressed, the CPU 2001 causes the LCD display unit 2013 to switch the screen to display the registration/edition screen 1700 shown in FIG. 12 (step S807). Then, the CPU 2001 senses whether or not any of the function buttons 1701*a* to 1701*h* is pressed on the registration/edition screen 1700. When the CPU 2001 senses that any one of the function buttons is pressed, the CPU 2001 causes the LCD display unit 2013 to display a processing flow setting screen 1800 for each pressed function button (step S807).

FIG. 15 shows a screen displayed when the CPU 2001 senses that the function button 1701*b* is pressed. on the processing flow setting window 1800 in FIG. 15 are arranged user boxes 1801, a setting cancel button 1802, an upon-execution-screen-opening button 1803, and an OK button 1804. When the CPU 2001 senses that any of the user boxes 1801 is pressed, the CPU 2001 displays a document selecting screen (not shown) stored in the pressed user box. Moreover, the selected document is registered in the processing flow as an input document. Although six boxes 00, 01, ..., 05 are shown as the user boxes in the example shown in FIG. 15, the user boxes are not limited to the example.

Returning to FIG. 10, in step S808, the CPU 2001 senses whether or not the OK button 1804 in the processing flow setting screen 1800 is pressed. As a result of the sensing, when the CPU 2001 senses that the OK button 1804 is pressed, the CPU 2001 causes the temporary storage region 1303 to store the set values for the processing flow set in the setting screen 1800 (in the above-described example, selected document information), followed by switching the screen to the registration/edition screen 1700 (step S807). When the CPU 2001 senses that the OK button 1704 of the registration/edition screen 1700 is pressed in step S808, the CPU 2001 causes the XML file 1304 to store the set values for the processing flow (step S809). The above-described registering processing for the processing flow functions as a first registering unit.

A description will now be given of the procedure of process replacement setting processing executed by the multifunctional peripheral shown in FIG. 1, with reference to FIG. 16 and FIG. 17.

Figure 16:
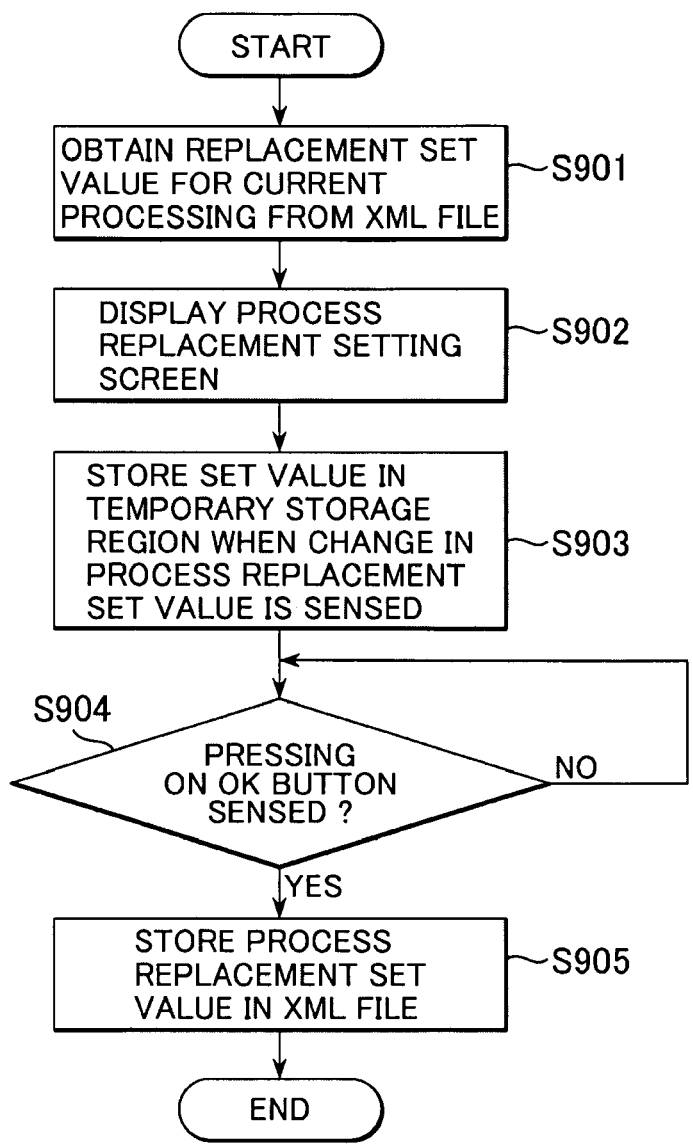
FIG. 16 is a flowchart showing the procedure of process replacement setting processing executed by the multifunctional peripheral shown in FIG. 1.

FIG. 16 is a flowchart showing the procedure of processes replacement setting processing executed by the multifunctional peripheral 1001 shown in FIG. 1. FIG. 17 is a view showing an exemplary replacement setting screen displayed on the LCD display unit 2013 when the process replacement setting processing shown in FIG. 16 is executed.

Figure 17:
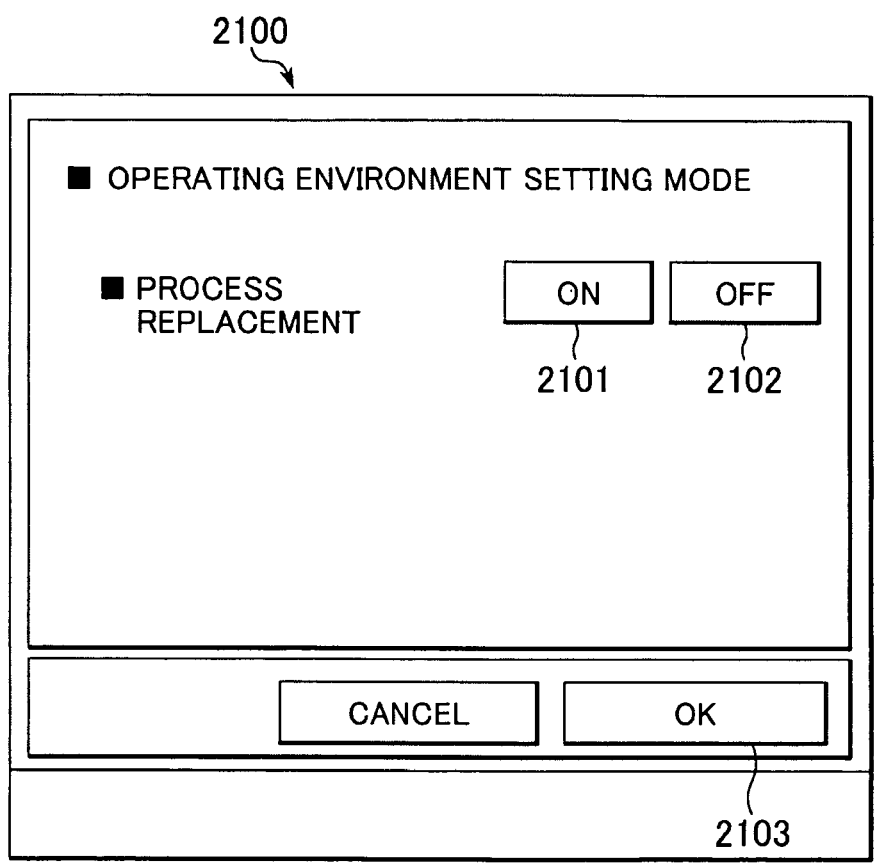
FIG. 17 is a view showing an exemplary replacement setting screen displayed on the LCD display unit when the process replacement setting processing shown in FIG. 16 is executed.

In FIG. 16, the CPU 2001 obtains a set value indicating whether or not to replace processes stored in the XML file 1304 (step S901), and causes a process replacement setting screen 2100 shown in FIG. 17 to be displayed (step S902). The set value is written in the XML file 1304 as a character string. In this instance, either an OK button 2101 or an OFF button 2102 is selected according to the current set value for process replacement.

In step S903, when the CPU 2001 senses that a process replacement setting is changed by pressing either the ON button 2101 or the OFF button 2102, the CPU 2001 causes the temporary storage region 1303 to store the new process replacement set value. In step S904, when the CPU 2001 senses that the OK button 2103 on the process replacement setting screen 2100 shown in FIG. 17 is pressed, the CPU 2001 causes the XML file 1304 to store the process replacement set value (step S905).

A description will now be given of the procedure of processing flow executing processing according to the first embodiment of the present invention with reference to FIG. 18 and FIG. 19.

Figure 18:
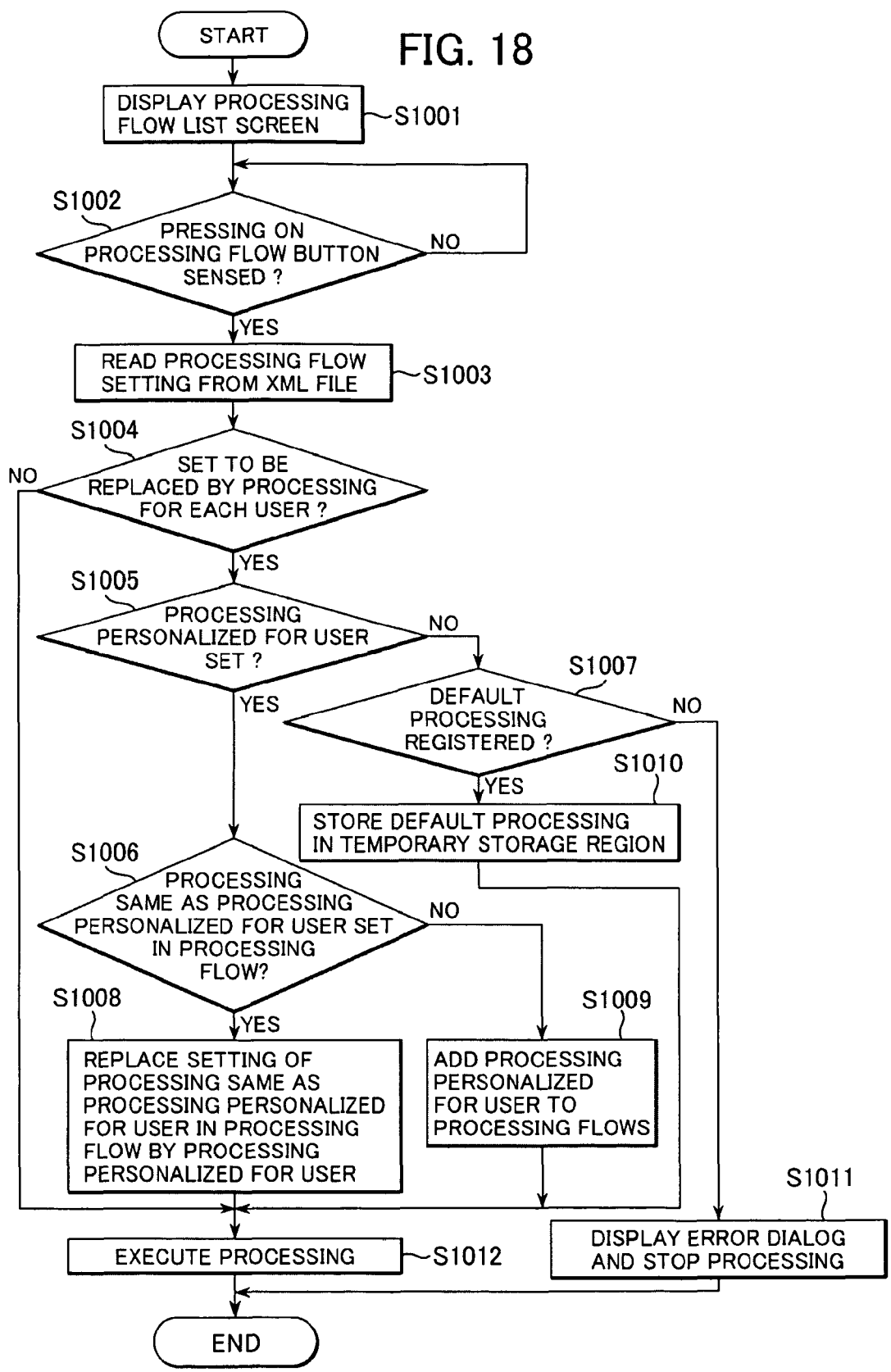
FIG. 18 is a flowchart showing the procedure of processing flow executing processing executed by the multifunctional peripheral shown in FIG. 1.

FIG. 18 is a flowchart showing the procedure of processing flow executing processing executed by the multifunctional peripheral 1001 shown in FIG. 1. FIG. 19 is a view showing an exemplary processing flow list screen displayed on the LCD display unit 2013 when the processing flow shown in FIG. 18 is executed.

Figure 19:
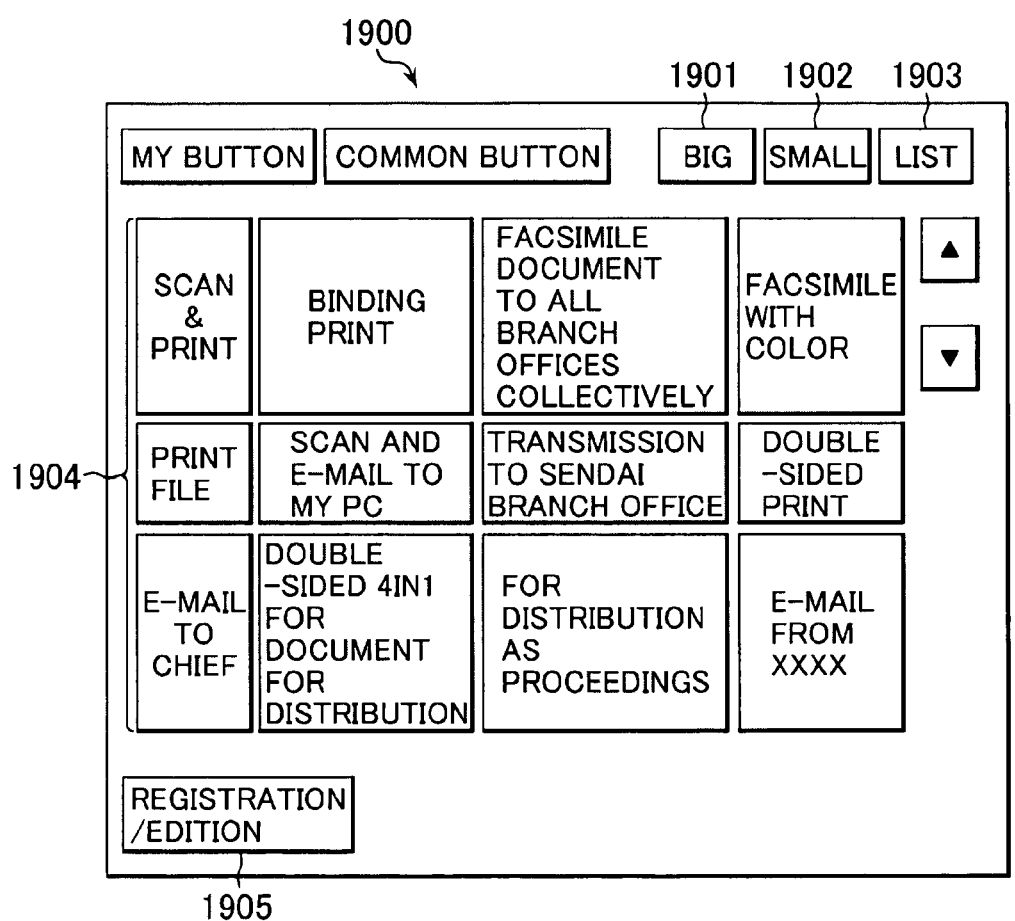
FIG. 19 is a view showing an exemplary processing flow list screen displayed on the LCD display unit when the processing flow shown in FIG. 18 is executed.

In FIG. 18, in step S1001, the CPU 2001 causes a processing flow list screen 1900 shown in FIG. 19 to display processing flow buttons 1904 corresponding to processing flows stored in the XML file 1304. The style of displaying the processing flow buttons 1904 can be switched among three patterns of large display, small display, and list display by pressing any of a big button 1901, a small button 1902, and a list button 1903. On the processing flow list window 1900 is arranged a registration/edition button 1905 for instructing to display the processing flow registration/edition initial screen 1400.

When the CPU 2001 senses that one of the processing flow buttons 1904 is pressed (YES to step S1002), the CPU 2001 reads, from the XML file 1304, set values for each process comprising the processing flow selected from the processing flows registered in the XML file 1304, and causes the temporary storage region 1303 to store the set values (step S1003).

In step S1004, the CPU 2001 checks whether or not the process replacement set value stored in the XML file 1304. As a result of the checking, when the set value is set to implement processes replacement (YES to the step S1004), the program proceeds to step S1005. If the set value is not set to implement process replacement (NO to the step S1004), the program proceeds to step S1012.

In step S1005, the CPU 2001 determines whether or not the processing personalized for the user is set in the setting data for each user stored in the temporary storage region 1303 (personalized processing determining unit). When the processing personalized for the user is set, the CPU 2001 determines whether or not the same processing as the processing personalized for the user is set in a processing flow stored in the temporary storage region 1303 (step S1006) (same processing determination unit). When the same processing as the processing personalized for the user is set in a processing flow stored in the temporary storage region 1303, the program proceeds to step S1008. In step S1008, the CPU 2001 replaces the same processing as the processing personalized for the user by the processing personalized for the user in the processing flow stored in the temporary storage region 1303.

If the same processing as the processing personalized for the user is not set in any processing flow stored in the temporary storage region 1303 in the step S1006, the CPU 2001 adds the processing personalized for the user to the processing flows stored in the temporary storage 1303 (step S1009).

As a result of the determination of the step S1005, if the processing personalized for the user is not set in the setting data for each user, the CPU 2001 determines whether or not default processing is registered (step S1007). As a result of the determination, when default processing is registered, the CPU 2001 replaces the set values for the processing flows stored in the temporary storage region 1303 by the default processing (step S1010).

On the contrary, in step S1007, the CPU 2001 determines whether or not default processing is registered. If the default processing is not registered as a result of the determination of the step S1007, the CPU 2001 causes an error dialog to be displayed of indicating that the processing cannot be executed (step S1011), followed by terminating the program.

In step S1012, the CPU 2001 analyzes and executes the processing flow stored in the temporary storage region 1303 (executing unit). In a case where the processing personalized for the user is set in the setting data for each user, the CPU 2001 replaces a part of the registered processing flow by the processing personalized for the user and executes the processing flow. In a case where the processing personalized for the user is not set in the setting data for each user and a default processing flow is registered, the CPU 2001 replaces a part of the registered processing flow by the registered default processing flow and executes the processing flow.

According to the above-described first embodiment, it is possible to achieve a processing desired by each user with a basic default processing flow, thereby eliminating the need for preparing a processing flow for each user, which enables the resource consumption to be kept to a certain level even when the number of users increases. Furthermore, it is possible to reduce the processing flows, which reduces time and effort required by the user in searching a desired processing flow.

Moreover, use of the default processing flow enables the user to use common processing flows irrespective of settings made by the user, which enables the processing flows to be used more effectively, and accordingly, improves the user's convenience.

The image processing apparatus according to a second embodiment of the present invention has the same basic arrangements as those of the above-described image processing apparatus according to the first embodiment (FIG. 1 to FIG. 5). The components same as those of the first embodiment are designated by the same reference symbols, detailed description of which, therefore, is omitted. Only those differ from the first embodiment will be described below.

Figure 20:
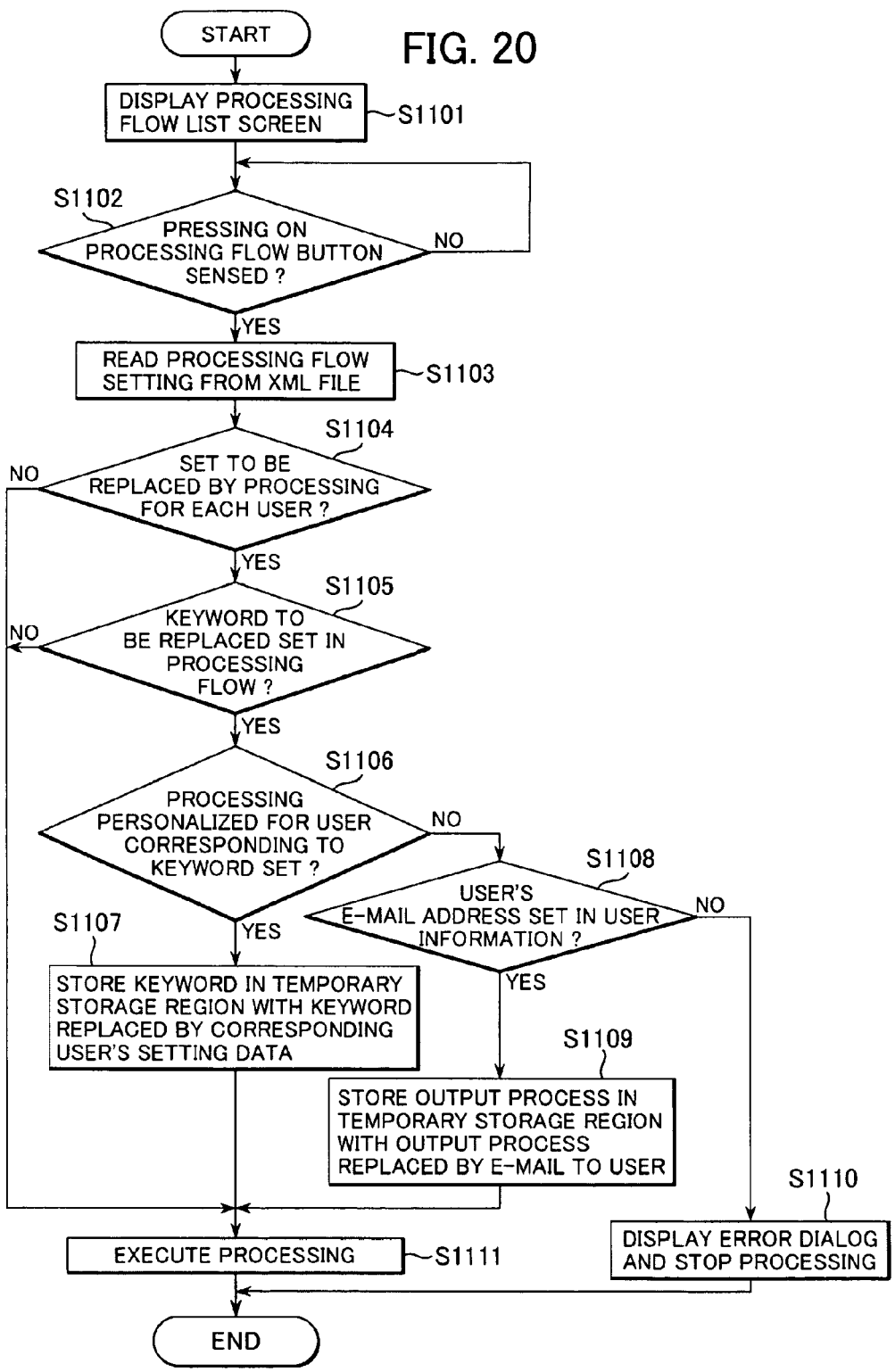
FIG. 20 is a flowchart showing the procedure of processing flow executing processing executed by the image processing apparatus according to a second embodiment of the present invention.

FIG. 20 is a flowchart showing the procedure of processing flow executing processing executed by the image processing apparatus according to a second embodiment of the present invention.

In FIG. 20, in step S1101, the CPU 2001 causes a processing flow list screen 1900 shown in FIG. 19 to display processing flow buttons 1904 corresponding to processing flows stored in the XML file 1304. In step S1102, the CPU 2001 senses whether or not one of the processing flow buttons 1904 is pressed. As a result of the sensing, when the CPU 2001 senses that one of the processing flow buttons 1904 is pressed, the CPU 2001 reads, from the XML file 1304, set values for each process comprising the selected processing flow (step S1103), and causes the temporary storage region 1303 to store the set values.

In step S1104, the CPU 2001 checks the processes replacement set value stored in the XML file 1304. As a result of the checking, when the set value is set to implement process replacement (YES to step S1104), the program proceeds to step S1105, whereas if the set value is not set to implement process replacement (NO to step S1104), the program proceeds to step S1111.

In step S1105, the CPU 2001 determines whether or not a keyword to be replaced (for example, %loginname%) is set in the character string parameter in the processing flow stored in the temporary storage region 1303 by searching the character string (keyword determining unit). It is assumed that the keywords to be replaced are stored in the HDD 2004 in advance. When the keyword to be replaced is set in the processing flow stored in the temporary storage region 1303, the program proceeds to step S1106. If no keyword to be replaced is set in the processing flow stored in the temporary storage region 1303, the program proceeds to step S1111.

In step S1106, the CPU 2001 determines whether or not any value is set in the setting data for each user (login user name) corresponding to the keyword to be replaced in the processing flow stored in the temporary storage region 1303 (setting data determining unit). As a result of the determination, when a value is set in the setting data for each user (login user name) corresponding to the keyword to be replaced in the processing flow stored in the temporary storage 1303, the program proceeds to step S1107.

In step S1107, the CPU 2001 replaces the keyword to be replaced in the processing flow stored in the temporary storage region 1303 by the corresponding setting data for each user (for example, a login user name).

As a result of the determination of the step S1106, when the CPU 2001 determines that no value is set in the setting data for each user (login user name) corresponding to the keyword to be replaced in the processing flow stored in the temporary storage region 1303, the program proceeds to step S1108, where the CPU 2001 determines whether or not an E-mail address corresponding to the user (for example, the user's personal E-mail address) is set in the setting data for each user (step S1108) (address determining unit). When the E-mail address corresponding to the user is set in the setting data for each user, the program proceeds to step S1109, where the CPU 2001 replaces the output process of the processing flow stored in the temporary storage region 1303 by the transmission process with the E-mail address corresponding to the user as the destination.

As a result of the determination of step S1108, when the CPU 2001 determines that the E-mail address corresponding to the user is not set in the setting data for each user, the CPU

2001 causes an error dialog to be displayed (step S1110), followed by terminating the program. In this instance, the application program may be adapted to prompt the user to input the E-mail address.

In the step S1111, the CPU 2001 analyzes and executes the processing flow stored in the temporary storage region 1303.

According to the second embodiment, it is possible to enhance the advantages of the first embodiment.

According to the first and second embodiments have been described on the assumption that the processing flow control method of the present invention is applied to a multifunctional peripheral for processing image data, the present invention is not limited thereto, but may be applied to an information processing apparatus such as a personal computer or a data processing apparatus with multiple functions. The processing flow is not limited to the image data processing, but may be a processing flow using various data.

In the first and second embodiments, login authentication is executed from the multifunctional peripheral 1001 to the directory service 1004 and the setting data for each user is obtained. The present invention, however, is not limited thereto, but the multifunctional peripheral 1001 itself may have the setting data for each user, and hence may execute login authentication.

The image processing apparatus according to a third embodiment of the present invention has the same basic arrangements as those of the above-described image processing apparatuses according to the first and second embodiments (FIG. 1 to FIG. 5). The components same as those of the first and second embodiments are designated by the same reference symbols, detailed description of which, therefore, is omitted. Only those differ from the first and second embodiments will be described below.

In the third embodiment, the registered processing is executed as processing personalized for the user by replacing a keyword set as a part of the processing setting by a keyword personalized for the user, instead of replacing all the set values for the registered processing by those personalized for the user.

FIG. 21 is a flowchart showing the procedure of processing flow executing processing executed by the image processing apparatus according to a third embodiment of the present invention.

In FIG. 21, in step S2101, the CPU 2001 causes the processing flow list screen 1900 shown in FIG. 19 to display processing flow buttons 1904 corresponding to processing flows stored in the XML file 1304. In step S2102, the CPU 2001 senses whether or not one of the processing flow buttons 1904 is pressed. As a result of the determination, when the CPU 2001 senses that one of the processing flow buttons 1904 is pressed, the CPU 2001 reads, from the XML file 1304, set values for each process comprising the selected processing flow (step S2103), and causes the temporary storage region 1303 to store the set values.

In step S2104, the CPU 2001 checks the process replacement set value stored in the XML file 1304. As a result of the checking, when the set value is set to implement process replacement, the program proceeds to step S2105, whereas when the set value is not set to implement process replacement, the program proceeds to step S2112. When the program proceeds to step S2112 as determined as negative in the step S2104, common processing that is not specialized for each user is executed.

In step S2105, the CPU 2001 determines whether or not a keyword to be replaced is set in the character string parameter in the processing flow stored in the temporary storage region 1303 (for example, %loginname%) by searching the character string (keyword determining unit). In this instance, let it be assumed that the keywords to be replaced are stored in the HDD 2004 in advance. When the keyword to be replaced is set in the processing flow stored in the temporary storage 1303, the program proceeds to step S2106. As a result of the determination, when no keyword to be replaced is set in the processing flow stored in the temporary storage region 1303, the program proceeds to step S2112. That is, when the program proceeds from the step S2104 to the step S2105, the common processing that is not specialized for each user is executed so long as no keyword to be replaced is set in the processing flow even if the processing flow is set to be replaced by processing for each user.

In step S2106, the CPU 2001 identifies the keyword to be replaced set in the character string parameter in the processing flow stored in the temporary storage region 1303. When the keyword to be replaced set in the character string parameter is a login user name (for example, %loginname%), the program proceeds to step S2107. When the keyword to be replaced set in the character string parameter is a displayed name (for example, %name%), the program proceeds to step S2108. When the keyword to be replaced set in the character string parameter is a domain name (for example, %domain%), the program proceeds to step S2109. When the keyword to be replaced set in the character string parameter is a section ID (for example, %sid%), the program proceeds to step S2110. When the keyword to be replaced set in the character string parameter is an E-mail address (for example, %email%), the program proceeds to step S2111.

In step S2107, the CPU 2001 replaces the keyword to be replaced set in the processing flow stored in the temporary storage region 1303 (for example, %loginname%) by the corresponding setting data for each user (a login user name), followed by the program proceeds to the step S2105.

In step S2108, the CPU 2001 replaces the keyword to be replaced set in the processing flow stored in the temporary storage region 1303 (for example, %name%) by the corresponding setting data for each user (a displayed name), followed by the program proceeding to the step S2105.

In step S2109, the CPU 2001 replaces the keyword to be replaced set in the processing flow stored in the temporary storage region 1303 (for example, %domain%) by the corresponding setting data for each user (a domain name), followed by the program proceeding to the step S2105.

In step S2110, the CPU 2001 replaces the keyword to be replaced set in the processing flow stored in the temporary storage region 1303 (for example, %sid%) by the corresponding setting data for each user (a section ID), followed by the program proceeding to the step S2105.

In step S2111, the CPU 2001 replaces the keyword to be replaced set in the processing flow stored in the temporary storage region 1303 (for example, %email%) by the corresponding setting data for each user (an E-mail address), followed by the program proceeding to the step S2105.

When the program returns to the step S2105 after processing in any one of the steps S2107 to S2111 is executed, the CPU 2001 determines whether or not any of the keywords to be replaced is left yet to be replaced. That is, when all the keywords that should be replaced (one to five kinds) included in the processing flow have been replaced, the program proceeds from the step S2105 to the step S2112. In step S2112, the processing flow that is partly replaced by the processing personalized for the user is executed.

In the step S2112, the CPU 2001 analyzes and executes the processing flow stored in the temporary storage region 1303. When the processing flow is executed in the step S2112, a function performed by the processing flow according to by what set value the character string is replaced.

A description will now be given of a case in which the processing flow is the file transmission (the FTP transmission or the SMB transmission) ("transmission" is selected for "output" in FIG. 12 with a transmitting method as the FTP transmission or the SMB transmission).

When the file transmission is to be executed, the multifunctional peripheral 1001 (CPU 2001) transforms image data input by the "input" process into an image file and causes the image file to be stored in a folder in a file server (external apparatus) on the LAN 1006 via the network I/F 2010. In this instance, the transmission destination is written in the form of "¥¥File_Server_A (information identifying the file server=the computer name of the file server) ¥SALES (one of the directory names in the file server) ¥the folder name at the storage destination". The file server may be a typical personal computer. It is assumed that an HDD of the file server is provided with various directories, one of which is provided with folders for respective users. The above-described computer name is given to the file server. The folder names are given so as to match the user names.

Therefore, in this embodiment, the output process of a processing flow for transmitting a file to one of folders made for respective users on the file server "¥¥File_Server_A¥SALES¥login user name (for example, user_A, user_B, . . . )" is directed to "file transmission". The transmission destination path (path information) of the file is set as "¥¥File_Server_A¥SALES¥%loginname%". When the user whose login user name is "user_A" logs in the system and executes a processing flow of file transmission, "%loginname%" is replaced by "user_A". Then, the document file is sent to the folder "¥¥File_Server_A¥SALES¥user_A" on the file server. In that case, "%loginname%" functions as the transmission destination path of the document for each user.

When the "%loginname%" is set in the file name of the document to be transmitted, "%loginname%" functions as the file name of the sent document for each user.

Although the function of the keyword to be replaced set in the processing flow varies as described above, the function is not limited to those mentioned above. A manner of the replacement can be stored in the HDD 2004 in advance so that the processing is executed according to that manner.

Therefore, in step S2112 in FIG. 21, if the output process of the processing flow is directed to the file transmission, the file transmission destined for the user's folder is executed in the above-described action. If no processing personalized for a user is specified, the processing flow predetermined as common processing is executed. Similarly, if the output process is other than the file transmission, the processing personalized for each user or common processing is executed according to the content of the output process.

Although the user is authenticated by the user name as identification in the above-described processing, the identification is not limited to the user name. The identification may be an ID card or the like. The identification may be anything if only it can identify the user and provide information on the user name of the user. It is needless to say that a group may be authenticated by a section name or the like instead of a user.

According to the third embodiment, it is possible to easily execute the processing personalized for each user (or each group) with a common button without consuming too many resources.

It is to be understood that the object of the present invention may also be accomplished by supplying a system or an apparatus with a storage medium in which a program code of software which realizes the functions of the above described embodiment is stored, and causing a computer (or CPU or MPU) of the system or apparatus to read out and execute the program code stored in the storage medium. In this case, the program code itself read from the storage medium realizes the functions of any of the embodiments described above, and hence the program code and the storage medium in which the program code is stored constitute the present invention.

Examples of the storage medium for supplying the program code include a floppy (registered trademark) disk, a hard disk, a magnetic-optical disk, a CD-ROM, a CD-R, a CD-RW, DVD-ROM, a DVD-RAM, a DVD-RW, a DVD+RW, a magnetic tape, a nonvolatile memory card, and a ROM. Alternatively, the program may be downloaded via a network.

Further, it is to be understood that the functions of the above described embodiment may be accomplished not only by executing a program code read out by a computer, but also by causing an OS (operating system) or the like which operates on the computer to perform a part or all of the actual operations based on instructions of the program code.

Further, it is to be understood that the functions of the above described embodiment may be accomplished by writing a program code read out from the storage medium into a memory provided on an expansion board inserted into a computer or in an expansion unit connected to the computer and then causing a CPU or the like provided in the expansion board or the expansion unit to perform a part or all of the actual operations based on instructions of the program code.

Moreover, it is understood that the functions of the embodiments described above may be realized not necessarily by causing the computer to read and execute the program code, but alternatively by causing an operating (OS) system running on the computer to perform part or all of the actual processing based on instructions in the program code. In this case, the program code may be supplied directly from a storage medium on which the program code is stored, or from a computer, database, or the like, not shown, that is connected via the Internet, a commercial network, a local area network, or the like.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-334486 filed Dec. 26, 2007, and Japanese Application No. 2008-092373 filed Mar. 31, 2008, which are hereby incorporated by reference herein in its entirety.

What is claimed is:

1. An image processing apparatus comprising:
a processor coupled to a memory and programmed to function as:
an authentication unit adapted to execute a user authentication;
an execution unit adapted to execute processing on image data with a plurality of processes as a sequential processing flow and cooperate a plurality of different functions with one another;
an obtaining unit adapted to obtain an inherent parameter of a user authenticated by the authentication unit;
a registration unit adapted to register sequential processing flow data representing the sequential processing flow; and
a setting unit adapted to set whether or not a predetermined variable included in the sequential processing flow data is to be replaced with the inherent parameter of the authenticated user, wherein, if the setting unit sets so that the predetermined variable included in the sequential processing flow data is to be replaced with the inherent parameter of the authenticated user, the execution unit executes the sequential processing flow with the predetermined variable included in the sequential processing flow data replaced with the inherent parameter of the authenticated user, and wherein, if the setting unit sets so that the predetermined variable included in the sequential processing flow data is not to be replaced with the inherent parameter of the authenticated user, the execution unit executes a common processing flow that is not specialized for each user.

2. The image processing apparatus according to claim 1, wherein, if the predetermined variable included in the sequential processing flow data is an e-mail address, the obtaining unit obtains an e-mail address of the authenticated user as the inherent parameter of the authenticated user.

3. The image processing apparatus according to claim 1, wherein, if the predetermined variable included in the sequential processing flow data is a section ID, the obtaining unit obtains a section ID of the authenticated user as the inherent parameter of the authenticated user.

4. The image processing apparatus as claimed in claim 1, wherein, if the predetermined variable included the sequential processing flow data is a domain name, the obtaining unit obtains a domain name of the authenticated user as the inherent parameter of the authenticated user.

5. The image processing apparatus according to claim 1, wherein, if the predetermined variable included in the sequential processing flow data is a login user name, the obtaining unit obtains a login user name of the authenticated user as the inherent parameter of the authenticated user.

6. The image processing apparatus as claimed in claim 1, wherein, if the predetermined variable included the sequential processing flow data is a displayed name, the obtaining unit obtains a displayed name of the authenticated user as the inherent parameter of the authenticated user.

7. The image processing apparatus according to claim 1, wherein, if the predetermined variable is not included in the sequential processing flow data, the execution unit executes a common processing flow that is not specialized for each user.

8. A processing flow control method of an image processing apparatus, the method comprising:
   an authentication step of executing an authentication of a user;
   an execution step of executing processing on image data with a plurality of processes as a sequential processing flow and cooperating a plurality of different functions with one another;
   an obtaining step of obtaining an inherent parameter of the user authenticated in the authentication step;
   a registration step of registering a sequential processing flow data representing the sequential processing flow; and
   a setting step of setting whether or not a predetermined variable included in the sequential processing flow data is to be replaced with the inherent parameter of the authenticated user, wherein, if the setting step sets so that the predetermined variable included in the sequential processing flow data is to be replaced with the inherent parameter of the authenticated user, the execution step executes the sequential processing flow with the predetermined variable included in the sequential processing flow data replaced with the inherent parameter of the authenticated user, and wherein, if the setting step sets so that the predetermined variable included in the sequential processing flow data is not to be replaced with the inherent parameter of the authenticated user, the execution step executes a common processing flow that is not specialized for each user.

9. A non-transitory computer-readable storage medium storing a program that when executed causes a computer to perform a processing flow control method, the method comprising:
   an authentication step of executing user authentication;
   an execution step of executing processing on image data with a plurality of processes as a sequential processing flow and cooperating a plurality of different functions with one another;
   an obtaining step of obtaining an inherent parameter of a user authenticated in the authentication step;
a registration step of registering a sequential processing flow data representing the sequential processing flow; and
   a setting step of setting whether or not a predetermined variable included in the sequential processing flow data is to be replaced with the inherent parameter of the authenticated user,
   wherein, if the setting step sets so that the predetermined variable included in the sequential processing flow data is to be replaced with the inherent parameter of the authenticated user, the execution step executes the sequential processing flow with the predetermined variable included in the sequential processing flow data replaced with the inherent parameter of the authenticated user, and wherein, if the setting step sets so that the predetermined variable included in the processing flow data is not to be replaced with the inherent parameter of the authenticated user, the execution step executes a common processing flow that is not specialized for each user.

* * * * *